United States Patent
You et al.

(10) Patent No.: US 10,171,957 B2
(45) Date of Patent: Jan. 1, 2019

(54) METHOD AND USER EQUIPMENT FOR RECEIVING BROADCAST/MULTICAST SERVICE, AND METHOD AND BASE STATION FOR TRANSMITTING BROADCAST/MULTICAST SERVICE

(71) Applicant: LG ELECTRONICS INC., Seoul (KR)

(72) Inventors: Hyangsun You, Anyang-si (KR); Joonkui Ahn, Anyang-si (KR); Yunjung Yi, Anyang-si (KR); Kijun Kim, Anyang-si (KR); Suckchel Yang, Anyang-si (KR)

( * ) Notice: Subject to any disclaimer, the term of this patent is extended or adjusted under 35 U.S.C. 154(b) by 503 days.

(21) Appl. No.: 14/411,138

(22) PCT Filed: Jun. 25, 2013

(86) PCT No.: PCT/KR2013/005591
§ 371 (c)(1),
(2) Date: Dec. 24, 2014

(87) PCT Pub. No.: WO2014/003407
PCT Pub. Date: Jan. 3, 2014

(65) Prior Publication Data
US 2015/0208208 A1    Jul. 23, 2015

Related U.S. Application Data

(60) Provisional application No. 61/664,115, filed on Jun. 25, 2012.

(51) Int. Cl.
H04W 4/06      (2009.01)
H04L 5/00      (2006.01)
(Continued)

(52) U.S. Cl.
CPC ............. *H04W 4/06* (2013.01); *H04L 5/0094* (2013.01); *H04W 72/005* (2013.01);
(Continued)

(58) Field of Classification Search
CPC ...................................................... H04W 4/06
See application file for complete search history.

(56) References Cited

U.S. PATENT DOCUMENTS

2005/0090278 A1    4/2005   Jeong et al.
2006/0058047 A1    3/2006   Jeong et al.
(Continued)

FOREIGN PATENT DOCUMENTS

KR    10-2005-0020720 A    3/2005
KR    10-2006-0025068 A    3/2006
(Continued)

*Primary Examiner* — Jason E Mattis
(74) *Attorney, Agent, or Firm* — Birch, Stewart, Kolasch & Birch, LLP

(57) ABSTRACT

The broadcast/multicast service according to the present invention is transmitted/received in a partial frequency region rather than the entire system bandwidth of a cell. The user equipment of the present invention may receive information regarding the frequency region set in the cell for receiving the broadcast/multicast service and receive the broadcast/multicast service over the frequency region based on the information.

12 Claims, 15 Drawing Sheets

(51) Int. Cl.
  *H04W 72/00*  (2009.01)
  *H04L 12/18*  (2006.01)
(52) U.S. Cl.
  CPC .......... *H04L 5/0048* (2013.01); *H04L 5/0053* (2013.01); *H04L 12/189* (2013.01)

(56) References Cited

U.S. PATENT DOCUMENTS

| | | |
|---|---|---|
| 2008/0113680 A1 | 5/2008 | Sung |
| 2010/0173578 A1 | 7/2010 | Wang et al. |
| 2011/0103333 A1* | 5/2011 | Berggren ................ H04L 5/001 370/329 |
| 2013/0223322 A1* | 8/2013 | Ode ..................... H04W 16/14 370/312 |

FOREIGN PATENT DOCUMENTS

| | | |
|---|---|---|
| KR | 10-2008-0043453 A | 5/2008 |
| KR | 10-2010-0099036 A | 9/2010 |
| KR | 10-1110185 B1 | 2/2012 |

\* cited by examiner

METHOD AND USER EQUIPMENT FOR RECEIVING BROADCAST/MULTICAST SERVICE, AND METHOD AND BASE STATION FOR TRANSMITTING BROADCAST/MULTICAST SERVICE

CROSS REFERENCE TO RELATED APPLICATIONS

This application is the National Phase of PCT International Application No. PCT/KR2013/005591, filed on Jun. 25, 2013, which claims priority under 35 U.S.C. 119(e) to U.S. Provisional Application No. 61/664,115, filed on Jun. 25, 2012, all of which are hereby expressly incorporated by reference into the present application.

TECHNICAL FIELD

The present invention relates to a method and apparatus for receiving a broadcast/multicast service and a method and apparatus for transmitting the broadcast/multicast service.

BACKGROUND ART

In a 3GPP long term evolution-advanced (LTE-A) system, a multimedia broadcast multicast service single frequency network (MBSFN)-based multimedia broadcast and multimedia service (MBMS) is defined in order to provide a broadcast service over a communication network. An MBSFN is technology for simultaneously transmitting the same data at the same time in all of nodes belonging to an MBSFN area in synchronization with a radio resource. Here, a node refers to a point capable of transmitting/receiving radio signals through communication with a user equipment (UE) and the MBSFN area refers to an area covered by one MBSFN. According to the MBSFN, even when the UE is located at an edge of coverage of a node that the UE has accessed, a signal of a neighboring node functions not as interference but as gain. That is, the MBSFN introduces a single frequency network (SFN) function for MBMS transmission, thereby reducing service interference caused by frequency switching in the middle of MBMS transmission. Therefore, the UE within the MBSFN area recognizes MBMS data transmitted by multiple nodes as data transmitted by one node and in this MBSFN area, the UE may receive a seamless broadcast service without an additional handover procedure even while in motion. In the MBSFN, since a plurality of nodes uses a single frequency in order to simultaneously perform synchronized transmission, frequency resources can be saved and spectrum efficiency can be raised.

According to the MBSFN defined up to now, in principle, the same MBMS can be provided only when multiple nodes use carriers having the same system bandwidth and the same center frequency. Such restrictions lead to a result of lowering utilization of finite radio resources.

DETAILED DESCRIPTION OF THE INVENTION

Technical Problems

Accordingly, the present invention proposes methods of more efficiently and effectively using an MBSFN.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving a broadcast/multicast service by a user equipment, comprising receiving frequency resource information of a specific cell for reception of the broadcast/multicast service; and receiving the broadcast/multicast service using the specific cell based on the frequency resource information, wherein the frequency resource information includes information indicating a frequency region to which the broadcast/multicast service is allocated out of a system bandwidth of the specific cell.

In another aspect of the present invention, provided herein is a user equipment for receiving a broadcast/multicast service, comprising a radio frequency (RF) unit and a processor configured to control the RF unit, wherein the processor controls the RF unit to receive frequency resource information of a specific cell for reception of the broadcast/multicast service; and controls the RF unit to receive the broadcast/multicast service using the specific cell based on the frequency resource information, and the frequency resource information includes information indicating a frequency region to which the broadcast/multicast service is allocated out of a system bandwidth of the specific cell.

In still another aspect of the present invention, provided herein is a method for transmitting a broadcast/multicast service by a base station, comprising transmitting frequency resource information of a specific cell for transmission of the broadcast/multicast service; and transmitting the broadcast/multicast service using the specific cell based on the frequency resource information, wherein the frequency resource information includes information indicating a frequency region to which the broadcast/multicast service is allocated out of a system bandwidth of the specific cell.

In a further aspect of the present invention, provided herein is a base station for transmitting a broadcast/multicast service, comprising a radio frequency (RF) unit and a processor configured to control the RF unit, wherein the processor controls the RF unit to transmit frequency resource information of a specific cell for transmission of the broadcast/multicast service; and controls the RF unit to transmit the broadcast/multicast service using the specific cell based on the frequency resource information, and the frequency resource information includes information indicating a frequency region to which the broadcast/multicast service is allocated out of a system bandwidth of the specific cell.

The frequency resource information may include information indicating the number of resource blocks included in the allocated frequency region and/or the location of the allocated frequency region in the system bandwidth.

The frequency resource information may further include information about center frequencies of cells other than the specific cell, used for transmission of the same service as the broadcast/multicast service.

Subcarriers corresponding to the center frequencies of the cells other than the specific cell may be assumed not to be the allocated frequency region.

A reference signal for the broadcast/multicast service may be further transmitted in the allocated frequency region.

The user equipment may receive the reference signal by assuming that a lowest frequency index in the allocated frequency region is a first frequency index.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, an MBSFN can be more efficiently used and radio resources can be efficiently used so that overall throughout of a radio system can be improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
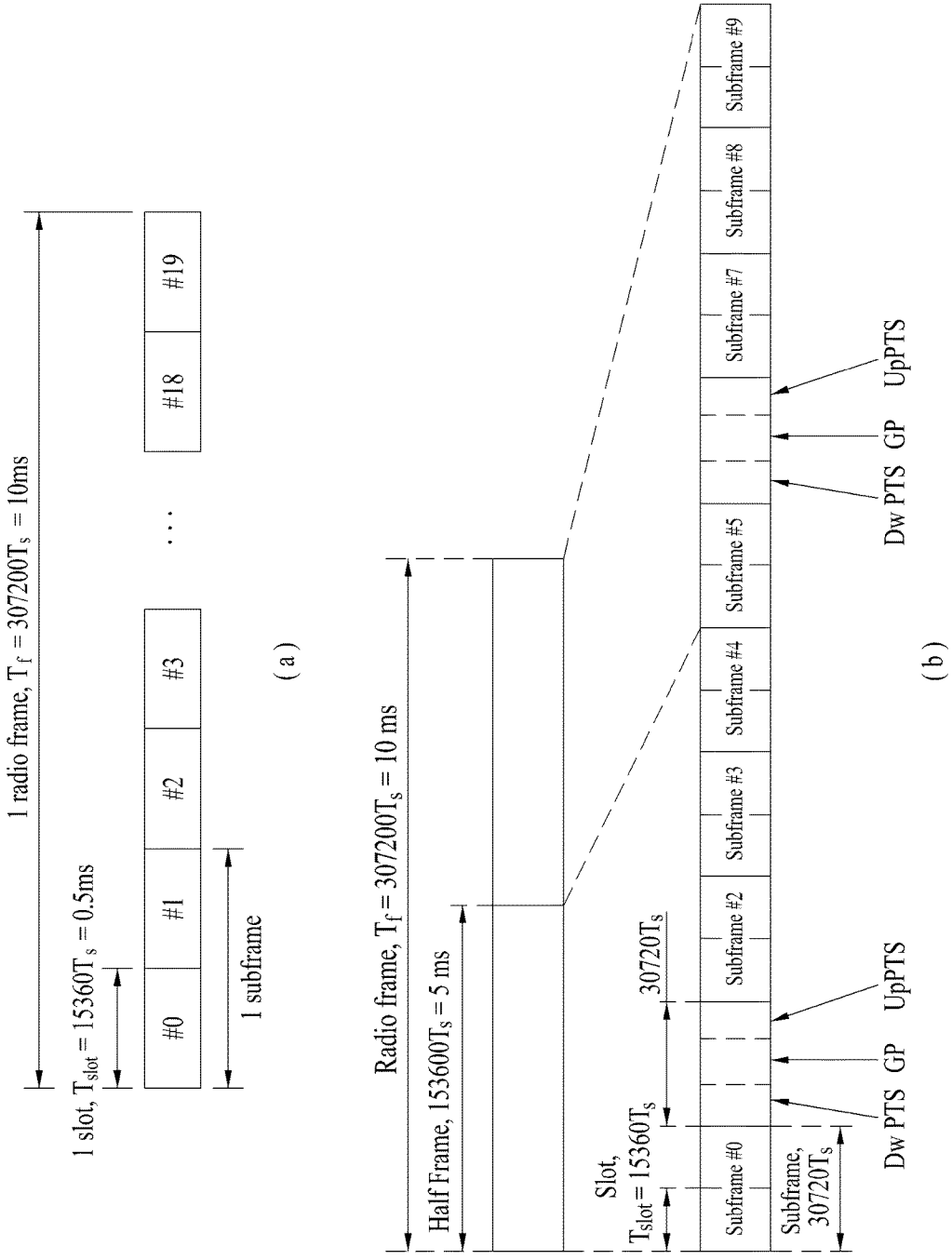
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a downlink/uplink time/frequency resource to a UE and the UE receives a downlink signal and transmits an uplink signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and if another device carries data on the network, the PC or the server waits and then transmits data. That is, when two or more users (e.g. PCs, UEs, etc.) simultaneously transmit data, collision occurs between simultaneous transmission and CSMA/CD is a scheme for monitoring collision so as to flexibly transmit the data. A transmitting device using CSMA/CD adjusts data transmission thereof by sensing data transmission caused by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for time determined according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, a node may not be an eNB. For example, a radio remote head (RRH) or a radio remote unit (RRU) may be a node. The RRH or RRU generally has a lower power level than a power level of an eNB. Since the RRH or RRU (hereinafter, an RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink (DL)/uplink (UL) signal of a specific cell refers to a downlink/uplink signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region. The cell associated with the radio resources will be described later with reference to FIGS. 9 and 10.

A "cell" of a geographic area may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. Notably, the term "cell" will hereinafter be used to indicate a cell associated with a radio resource unless particularly mentioned as a cell of a geographic area, for convenience of description. In addition, if a "cell" of a geographic area transmits/receives a signal, this is expressed such that a node of the "cell" transmits/receives a signal. Hence, the term "serving cell" described hereinbelow refers to a cell configured for a UE as a radio resource unless particularly specified otherwise. However, "cell" in cell specific reference signal (CRS), "cell" in cell identity, or "cell" in physical layer cell identity $N^{cell}_{ID}$ can be a cell of a geographic area rather than a cell associated with a radio resource. Accordingly, the term serving cell in "CRS of serving cell" or the term serving cell in "(physical layer) cell of serving cell" refers to a serving cell associated with a geographic area rather than a serving cell associated with a radio resource.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In the present invention, a CRS port, a UE-RS port, a CSI-RS port, and an MBSFN-RS port refer to an antenna port configured to transmit a CRS, an antenna port configured to transmit a UE-RS, an antenna port configured to transmit a CSI-RS, and an antenna port configured to transmit an MBSFN RS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS ports may also be used to indicate a pattern of REs occupied by CRSs/UE-RSs/CSI-RSs in a predetermined resource region.

A detailed description of embodiments of the present invention will be given by referring to a carrier configured according to a legacy radio communication standard as a legacy carrier type (LCT) carrier, an LCT component carrier (CC), an LCT cell, or a normal carrier and by referring to a carrier configured according to less restrictions relative to the LCT carrier as a new carrier type (NCT) carrier, an NCT CC, an NCT cell, or an extended carrier. For example, according to an embodiment of the present invention, a carrier on which an MBSFN service is configured by a scheme different from a legacy MBSFN service configuration scheme can be the NCT carrier.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

Figure 2:
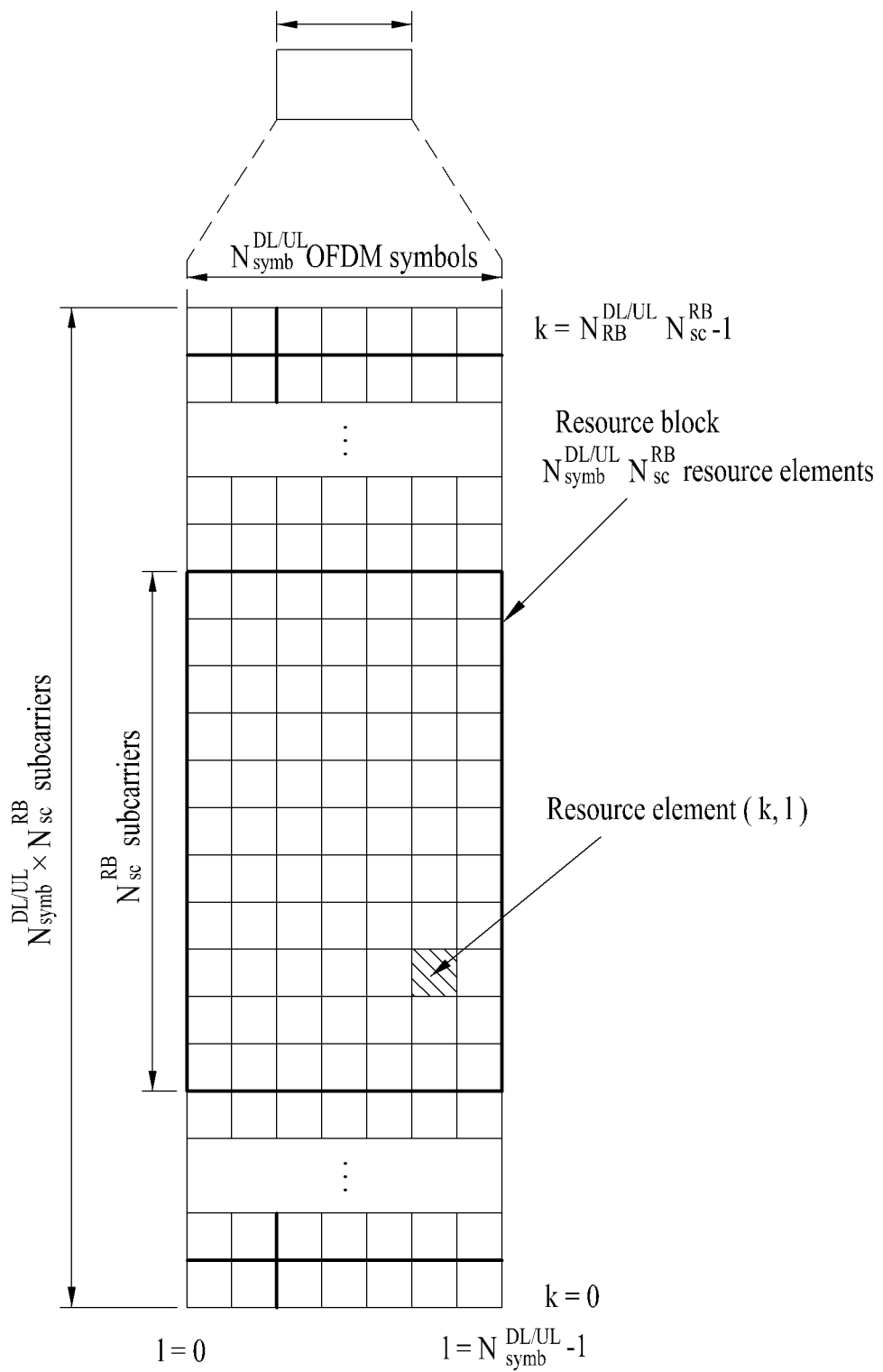
FIG. 2 illustrates the structure of a downlink (DL)/uplink (UL) slot in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an

TABLE 2

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
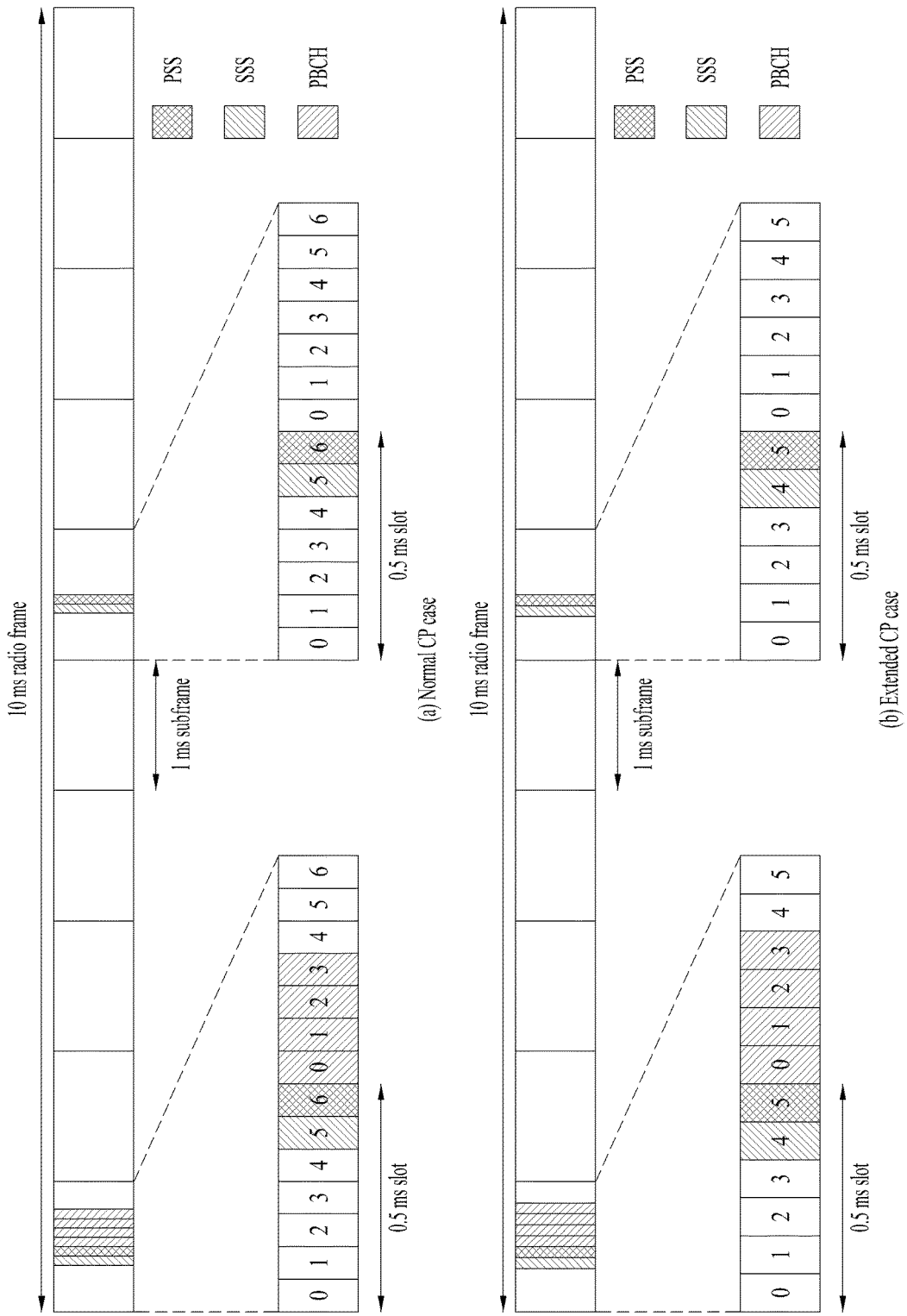
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefore are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}(=3N^{(1)}_{ID}+N^{(2)}_{ID})$ is uniquely defined as number $N^{(1)}_{ID}$ in the range of 0 to 167 indicating a physical layer cell ID group and number $N^{(2)}_{ID}$ from 0 to 2 indicating a physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \quad \text{[Equation 1]}$$

where $N_{SC}=63$ and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in Equation 1. Since u=24 and u=34 have a conjugate symmetry relation, two correlations may be simultaneously performed. Here, conjugate symmetry indicates the relationship of the following Equation.

$$d_u(n)=(-1)^n(d_{N_{ZC}-u}(n))^*, \text{ when } N_{ZC} \text{ is even number}$$

$$d_u(n)=(d_{N_{ZC}-u}(n))^*, \text{ when } N_{ZC} \text{ is odd number} \quad \text{[Equation 2]}$$

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

In Equation 3, the Zadoff-Chu root sequence index u is given by the following table.

TABLE 3

| $N^{(2)}_{ID}$ | Root index u |
|---|---|
| 0 | 25 |
| 1 | 29 |
| 2 | 34 |

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Figure 4:
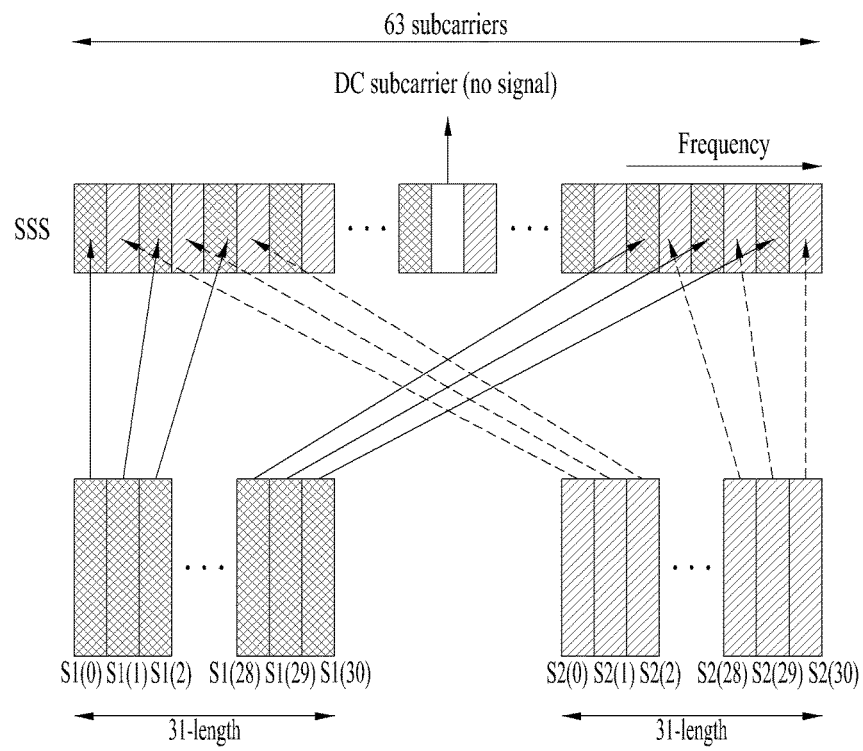
FIG. 4 illustrates a secondary synchronization signal (SSS) generation scheme.

FIG. 4 illustrates an SSS generation scheme. Specifically, FIG. 4 illustrates a relationship of mapping of two sequences in a logical domain to sequences in a physical domain.

A sequence used for the SSS is an interleaved concatenation of two length-31 m-sequences of and the concatenated sequence is scrambled by a scrambling sequence given by a PSS. Here, an m-sequence is a type of a pseudo noise (PN) sequence.

Referring to FIG. 4, if two m-sequences used for generating an SSS code are S1 and S2, then two different PSS-based sequences S1 and S2 are scrambled into to the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence $d(0), \ldots, d(61)$ used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 according to the following.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 4]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \leq n \leq 30$. The indices $m_0$ and $m_1$ are derived from the physical-layer cell-identity group $N^{(1)}_{ID}$ according to the following.

$$m_0 = m' \bmod 31$$ [Equation 5]

$$m_1 = (m_0 + \lfloor m'/31 \rfloor + 1) \bmod 31$$

$$m' = N^{(1)}_{ID} + q(q+1)/2,$$

$$q = \left\lfloor \frac{N^{(1)}_{ID} + q'(q'+1)/2}{30} \right\rfloor, q' = \lfloor N^{(1)}_{ID}/30 \rfloor$$

The output of Equation 5 is listed in Table 4 following Equation 11.

The two sequences $s^{(m0)}_0(n)$ and $s^{(m1)}_1(n)$ are defined as two different cyclic shifts of the m-sequence $s(n)$.

$$s_0^{(m0)}(n) = s((n+m_0) \bmod 31)$$

$$s_1^{(m1)}(n) = s((n+m_1) \bmod 31)$$ [Equation 6]

In Equation 6, $s(i)=1-x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5) = (x(\bar{i}+3)+x(\bar{i})) \bmod 2, 0 \leq \bar{i} \leq 25$$ [Equation 7]

The two scrambling sequences $c_0(n)$ and $c_1(n)$ depend on the PSS and are defined by two different cyclic shifts of the m-sequence $c(n)$ according to the following equation.

$$c_0(n) = c((n+N^{(2)}_{ID}) \bmod 31)$$

$$c_1(n) = c((n+N^{(2)}_{ID}+3) \bmod 31)$$ [Equation 8]

In Equation 8, $N^{(2)}_{ID} \in \{0, 1, 2\}$ is the physical-layer identity within the physical-layer cell identity group $N^{(1)}_{ID}$ and $c(i)=1-2x(i)$ $(0 \leq i \leq 30)$, is defined by the following equation with initial conditions $x(0)=0$, $x(1)=0$, $x(2)$, $x(3)=0$, $x(4)=1$.

$$x(\bar{i}5) = (x(\bar{i}+3)+x(\bar{i})) \bmod 2, 0 \leq \bar{i} \leq 25$$ [Equation 9]

The scrambling sequences $z^{(m0)}_1(n)$ and $z^{(m1)}_1(n)$ are defined by a cyclic shift of the m-sequence $z(n)$ according to the following equation.

$$z_1^{(m0)}(n) = z((n+(m_0 \bmod 8)) \bmod 31)$$

$$z_1^{(m1)}(n) = z((n+(m_1 \bmod 8)) \bmod 31)$$ [Equation 10]

In Equation 10, $m_0$ and $m_1$ are obtained from Table 4 following Equation 11 and $z(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5) = (x(\bar{i}+4)+x(\bar{i}+2)+x(\bar{i}+1)+x(\bar{i})) \bmod 2, 0 \leq \bar{i} \leq 25$$ [Equation 11]

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |

TABLE 4-continued

| $N_{ID}^{(1)}$ | $m_0$ | $m_1$ |
|---|---|---|
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 5:
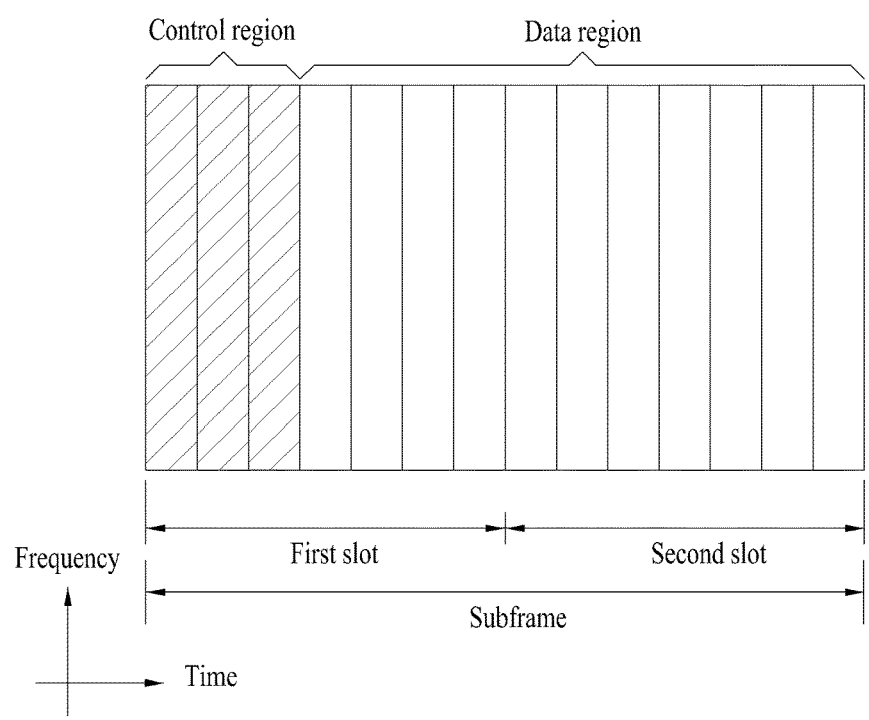
FIG. 5 illustrates the structure of a DL subframe used in a wireless communication system.

FIG. 5 illustrates the structure of a DL subframe used in a wireless communication system.

A DL subframe is divided into a control region and a data region in the time domain. Referring to FIG. 5, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS and is configured for each individual UE. The common SS is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of TMs 1 to 9. To maintain operation load of the UE according to blind decoding attempt at a predetermined level or less, all DCI formats are not always simultaneously searched by the UE.

In order for the UE to demodulate or decode a DL signal, an RS for estimating a channel between the UE and a node which has transmitted the DL signal is needed. A CRS defined in the LTE system may be used for both demodulation and measurement. A dedicated reference signal (DRS) is known to a specific UE and a CRS is known to all UEs. The CRS defined in the 3GPP LTE system can be a type of a common RS. For reference, since demodulation is a part of a decoding procedure, the term demodulation is used interchangeably with the term decoding.

Figure 6:
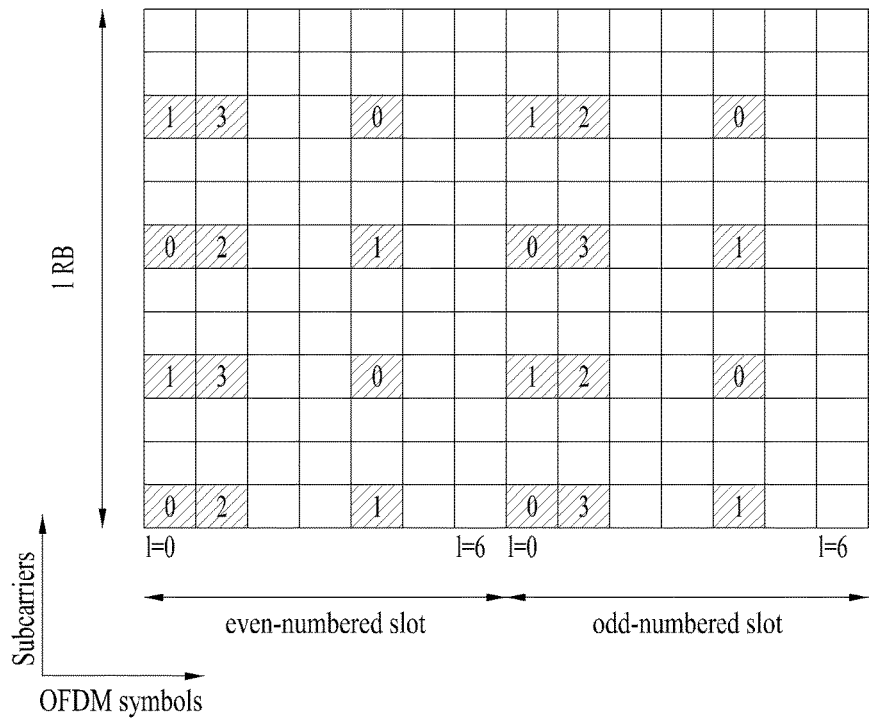
FIG. 6 illustrates configuration of cell specific common reference signals (CRSs).

FIG. 6 illustrates configuration of cell specific reference signals (CRSs). Especially, FIG. 6 illustrates configuration of CRSs for a 3GPP LTE system supporting a maximum of four antennas.

In a legacy 3GPP system, since a CRS is used for both demodulation and measurement, the CRS is transmitted over an entire DL BW in all DL subframes in a cell supporting PDSCH transmission and is transmitted through all antenna ports configured at an eNB. A UE may measure CSI using the CRS and demodulate a signal received on a PDSCH in a subframe including the CRS. That is, the eNB transmits the CRS at a predetermined location in each of all RBs and the UE performs channel estimation based on the CRS and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRS, since the eNB should transmit the CRS in all RBs, unnecessary RS overhead occurs. To solve this problem, a UE-specific RS (hereinafter, UE-RS) and a CSI-RS are further defined in the 3GPP LTE-A system in addition to the CRS. The UE-RS is used for demodulation and the CSI-RS is used to derive channel state information (CSI). The UE-RS can be a type of a DRS.

Figure 7:
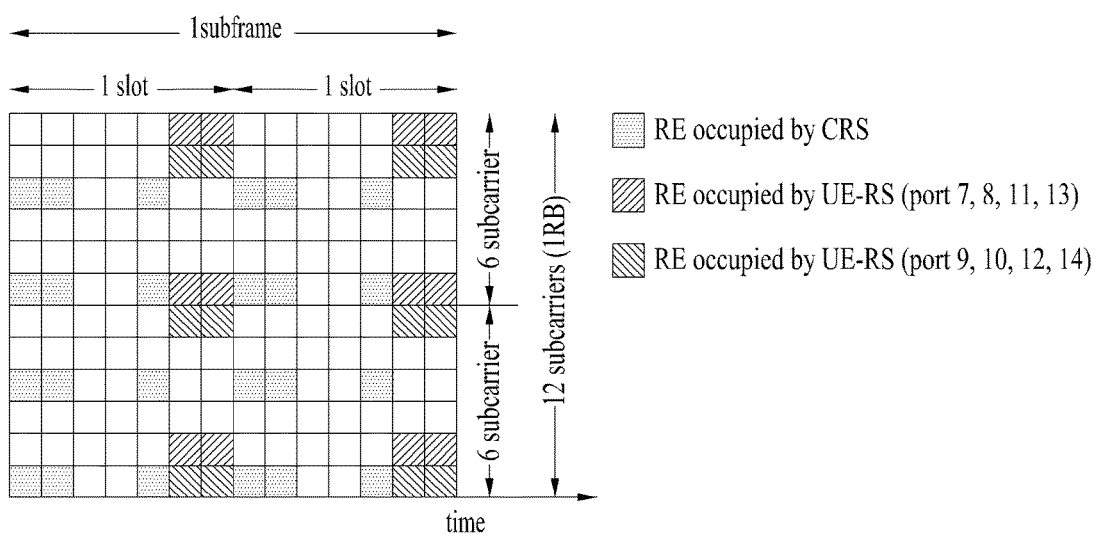
FIG. 7 illustrates UE-specific reference signals (UE-RSs).

FIG. 7 illustrates UE-specific reference signals (UE-RSs). In more detail, FIG. 7 illustrates REs occupied by a UE-RS among REs in one RB pair of a normal DL subframe having a normal CP.

The UE-RS is transmitted on antenna port(s) p=5, p=7, p=8 or p=7, 8, . . . , υ+6 for PDSCH transmission (where υ is the number of layers used for PDSCH transmission). The UE-RS is present only if the PDSCH transmission is associated with a corresponding antenna port and the UE-RS is a valid reference only for PDSCH demodulation. The UE-RS is transmitted only on RBs to which a corresponding PDSCH is mapped. That is, the UE-RS is configured to be transmitted only on RB(s) to which the PDSCH is mapped in a subframe in which the PDSCH is scheduled, unlike a CRS configured to be transmitted in every subframe irrespective of whether the PDSCH is present. In addition, the UE-RS is transmitted only on antenna port(s) corresponding respectively to layer(s) of the PDSCH, unlike the CRS transmitted on all antenna port(s) regardless of the number of layers of the PDSCH. 'Accordingly, the UE-RSs can reduce RS overhead relative to the CRSs.

In the 3GPP LTE-A system, the UE-RSs are defined in a PRB pair. Referring to FIG. 7, in a PRB having frequency-domain index $n_{PRB}$ assigned for PDSCH transmission with respect to p=7, p=8, or p=7, 8, . . . , υ+6, a part of UE-RS sequence r(m) is mapped to complex modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \qquad \text{[Equation 12]}$$

In Equation 12, $w_p(i)$, l', m' are given as follows.

[Equation 13]
$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

-continued $$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a specialsubframe with configuration 3, 4, or 8 (see Table 2)} \\ l' \bmod 2 + 2 + 3\lfloor l'/2 \rfloor & \text{if in a specialsubframe with configuration 1, 2, 6, or 7 (see Table 2)} \\ l' \bmod 2 + 5 & \text{if not in a specialsubframe} \end{cases}$$

$$l' = \begin{cases} 0, 1, 2, 3 & \text{if } n_s \bmod 2 = 0 \text{ and in a specialsubframe with configuration 1, 2, 6, or 7 (see Table 2)} \\ 0, 1 & \text{if } n_s \bmod 2 = 0 \text{ and not in specialsubframe with configuration 1, 2, 6, or 7 (see Table 2)} \\ 2, 3 & \text{if } n_s \bmod 2 = 1 \text{ and not in specialsubframe with configuration 1, 2, 6, or 7 (see Table 2)} \end{cases}$$

$$m' = 0, 1, 2$$

In Equation 13, the sequence $\overline{w}_p(i)$ for normal CP is given according to the following table.

TABLE 5

| Antenna port p | $[\overline{w}_p(0) \ \overline{w}_p(1) \ \overline{w}_p(2) \ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, \upsilon+6\}$, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 15]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. Output sequence c(n) (where n=0, 1, ..., $M_{PN}$−1) of length $M_{PN}$ is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 16]}$$

In Equation 16, $N_C$=1600 and the first m-sequence is initialized with $x_1(0)$=1, $x_1(n)$=0, n=1, 2, ..., 30 and the second m-sequence is denoted by $c_{init} = \sum_{i=0}^{30} x_2(i) \cdot 2^i$ having a value depending on the application of the first m-sequence.

In Equation 15, a pseudo-random sequence generator for c(i) is initialized with $c_{init}$ at the start of each subframe according to Equation 17 below.

$$c_{init} = (\lfloor n_s/2 \rfloor + 1) \cdot (2N_{ID}^{cell} + 1) \cdot 2^{16} + n_{SCID} \quad \text{[Equation 17]}$$

In Equation 17, the value of $n_{SCID}$ is set to 0 unless specified otherwise. For PDSCH transmission on antenna port 7 or 8, $n_{SCID}$ is given by DCI format 2B or 2C associated with PDSCH transmission. DCI format 2B is a DCI format for resource assignment for a PDSCH using a maximum of two antenna ports with UE-RSs and DCI format 2C is a DCI format for resource assignment for a PDSCH using a maximum of 8 antenna ports with UE-RSs.

Figure 8:
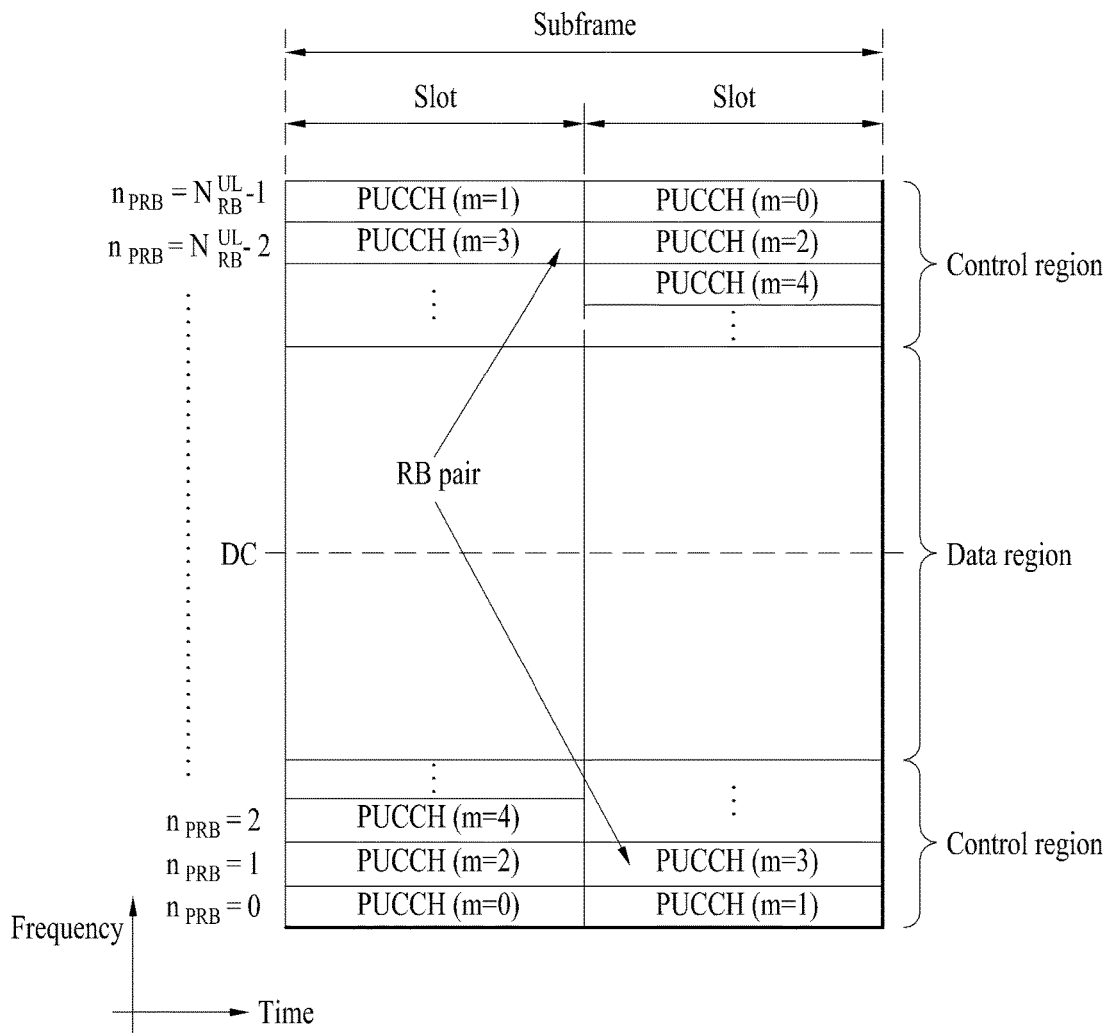
FIG. 8 illustrates the structure of a UL subframe used in a wireless communication system.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. The CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE when the eNB uses the PMI.

Figure 9:
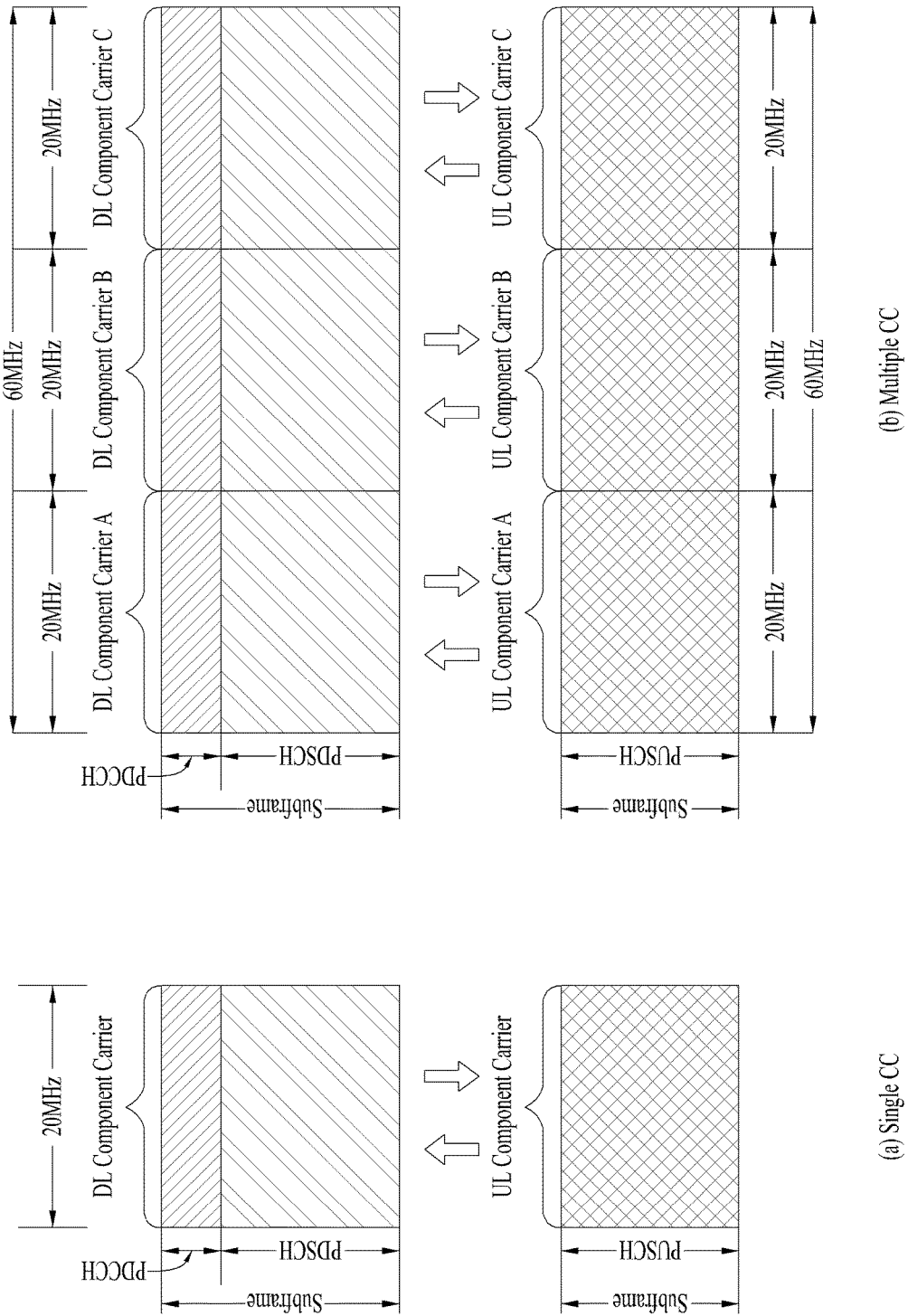
FIG. 9 is a diagram for explaining single-carrier communication and multi-carrier communication.

FIG. 9 is a diagram for explaining single-carrier communication and multi-carrier communication. Specially, FIG. 9(a) illustrates a subframe structure of a single carrier and FIG. 9(b) illustrates a subframe structure of multiple carriers.

Referring to FIG. 9(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 9(b), three 20 MHz CCs in each of UL and DL are aggregated to support a BW of 60 MHz. The CCs may be contiguous or non-contiguous in the frequency domain. Although FIG. 9(b) illustrates that a BW of UL CC and a BW of DL CC are the same as each other and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 10:
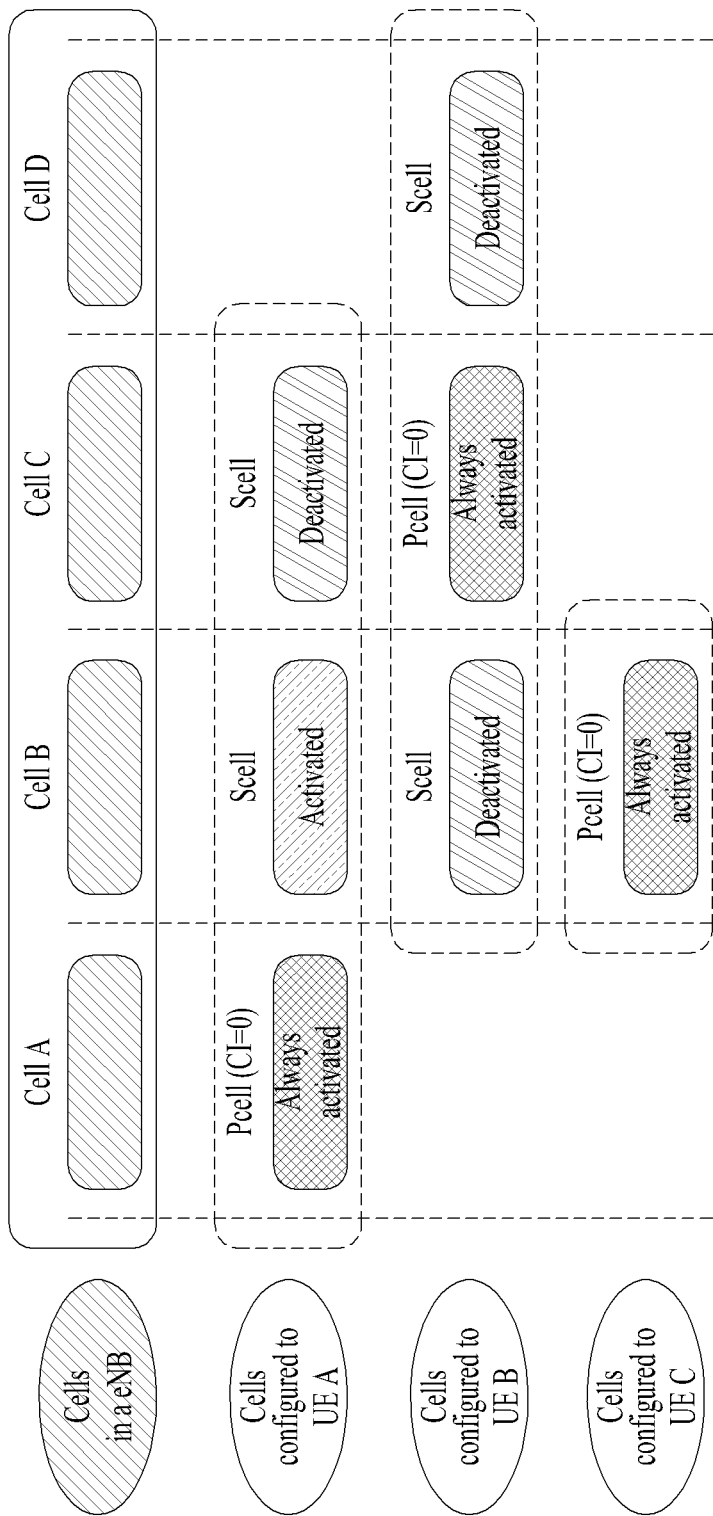
FIG. 10 illustrates the state of cells in a system supporting carrier aggregation.

FIG. 10 illustrates the state of cells in a system supporting carrier aggregation.

In FIG. 10, a configured cell refers to a cell in which carrier aggregation is performed for a UE based on a measurement report from another eNB or UE among cells of an eNB and is configured for each UE. The cell configured for the UE can be a serving cell in terms of the UE. The cell configured for the UE, i.e. the serving cell, prereserves resources for ACK/NACK transmission for PDSCH transmission. An activated cell refers to a cell configured to be actually used for PDSCH/PUSCH transmission among cells configured for the UE. CSI reporting and SRS transmission for PDSCH/PUSCH transmission are performed in the activated cell. A deactivated cell refers to a cell configured not to be used for PDSCH/PUSCH transmission by the command of the eNB or the operation of a timer. If a cell is deactivated, CSI reporting and SRS transmission are also stopped in the deactivated cell. For reference, in FIG. 10, CI denotes the above-described serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

Figure 11:
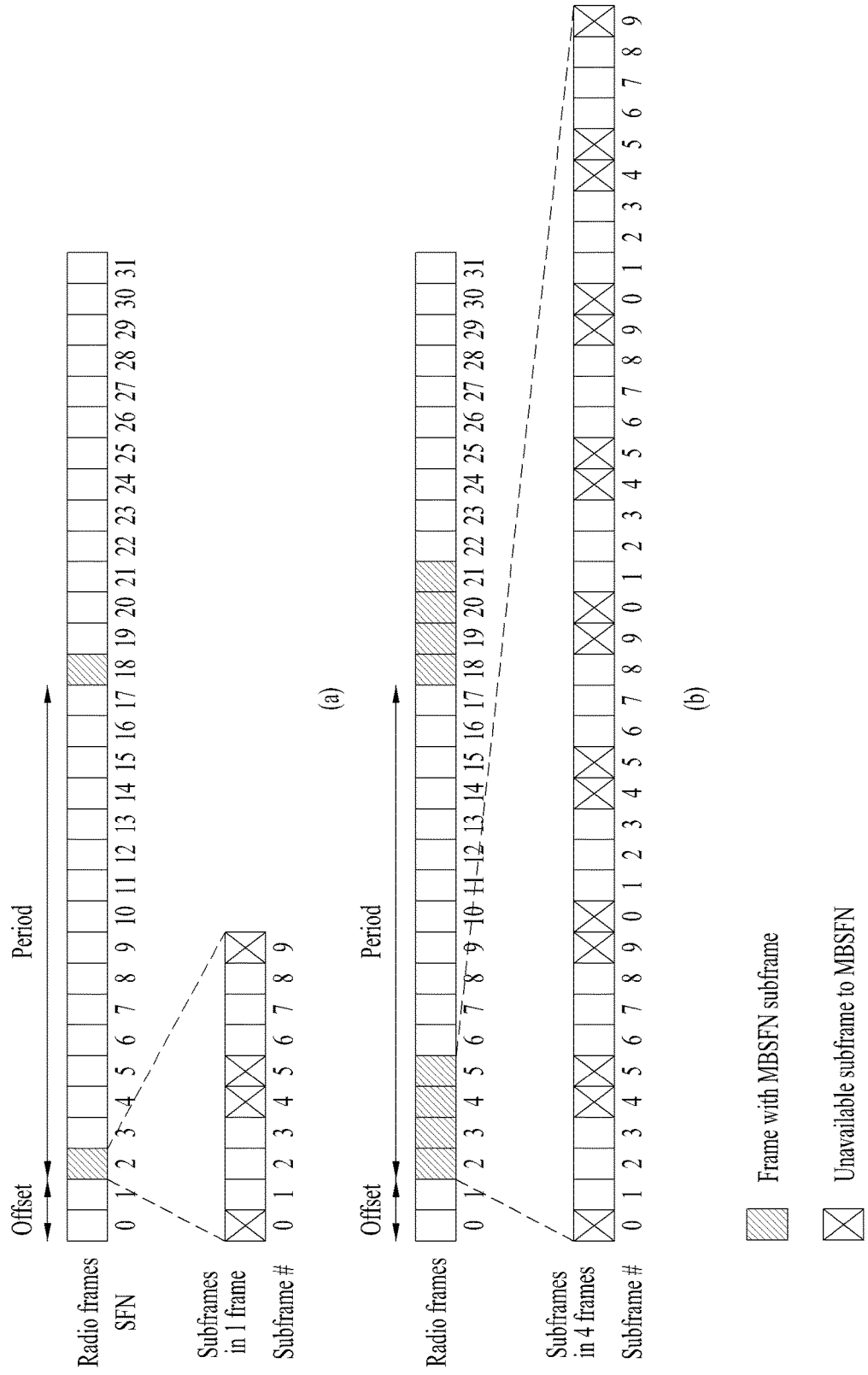
FIG. 11 is a diagram for explaining a method for configuring a subframe for an MBSFN in 3GPP LTE-A.

FIG. 11 is a diagram for explaining a method for configuring a subframe for an MBSFN in 3GPP LTE-A.

In order to support DL transmission from one point to a plurality of points in the 3GPP LTE-A system, two logical channels, a multicast control channel (MCCH) and a multicast traffic channel (MTCH), are defined. The MCCH is used to transmit control messages of all MBMS services to one MBSFN area and the MTCH is used to transmit session data of one MBMS service. The session data is associated with content of the MBMS service. Both the MCCH and MTCH are mapped to a transport channel called a multicast channel (MCH). The MCH is mapped to a PMCH among physical channels. There may be multiple PMCHs according to characteristics of the MBMS service and the PMCHs are transmitted only in an MBSFN subframe. A subset of a DL subframe in a radio frame on a carrier supporting PDSCH transmission may be configured as the MBSFN subframe by a higher layer signal.

The UE can be aware of which subframes are reserved for the MBSFN by receiving the higher layer signal indicating MBSFN subframes. The higher layer signal defining subframes reserved for the MBSFN in DL (hereinafter, MBSFN subframes) may include information about an allocation period of a radio frame including the MBSFN subframes and an allocation offset specifying the start location of the radio frame including the MBSFN subframes. For example, referring to FIG. 11, upon receiving the higher layer signal, the allocation period of which is 8 and the allocation offset of which is 2, the UE may determine that radio frames having system frame numbers (SFNs) satisfying the condition that the result of performing modulo operation of an SFN by allocation period "8" is the allocation offset, 2, include MBSFN subframes. That is, the UE can be aware that an MBSFN subframe is included in a radio frame having an SFN satisfying "SFN mod (period)=offset". Meanwhile, the higher layer signal includes a 6-bit bitmap corresponding one-to-one to subframe #1, #2, #3, #6, #7, and #8 among subframes #0 to #9 in one radio frame or a 24-bit bitmap corresponding one-to-one to subframe #1, #2, #3, #6, #7, and #8 of each of four consecutive radio frames. The eNB may allocate the PMCH to a subframe set to '1' in the 6-bit bitmap or 24-bit bitmap and transmit an MBSFN service, i.e. an MBMS, on the PMCH in the subframe. The UE may assume that a subframe corresponding to a bit set to '1' in the 6-bit bitmap or 24-bit bitmap is a subframe reserved as the MBSFN and receive the MBMS through the PMCH in the subframe.

Figure 12:
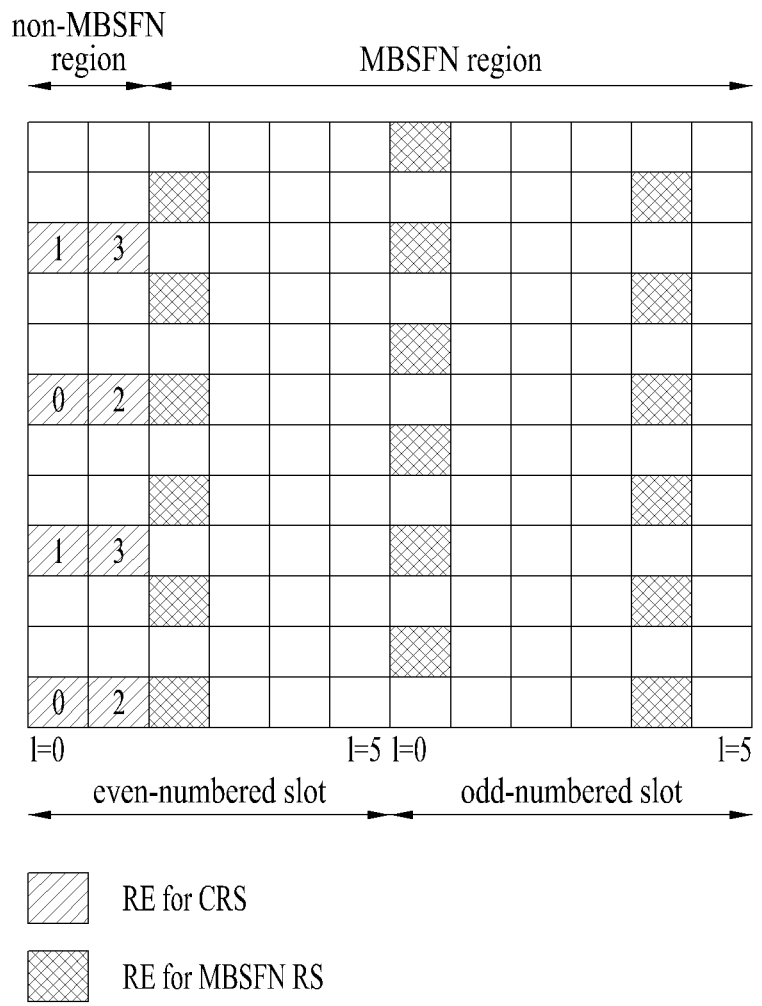
FIG. 12 illustrates the structure of an MBSFN subframe.

FIG. 12 illustrates the structure of an MBSFN subframe.

Each MBSFN subframe is divided into a non-MBSFN region and an MBSFN region in the time domain. The non-MBSFN region spans one or two front OFDM symbols and the MBSFN region in the MBSFN subframe is defined as OFDM symbols unused for the non-MBSFN region. The length of the non-MBSFN region may be given by Table 6 indicating the number of OFDM symbols which can be used to transmit PDCCH(s). In order to prevent a UE incapable of supporting an MBSFN from recognizing transmission in the MBSFN subframe as an error and to cause the UE to obtain DCI at least in the non-MBSFN region, the same length as the length of a CP used for subframe #0 may be used for transmission in the non-MBSFN region.

TABLE 6

| Subframe | Number of OFDM symbols for PDCCH when $N_{RB}^{DL} > 10$ | Number of OFDM symbols for PDCCH when $N_{RB}^{DL} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A PMCH may be transmitted only in the MBSFN region of the MBSFN subframe and uses an extended CP. Therefore, a current MBSFN subframe uses an extended CP and includes 12 OFDM symbols in the case of a subcarrier spacing of Δf=15 kHz.

In the MBSFN subframe, a CRS is transmitted only in the non-MBSFN region of the MBSFN subframe. Referring to FIG. 12, if the non-MBSFN region spans the first two OFDM symbols of the MBSFN subframe, the CRS is transmitted only on the first two OFDM symbols. An MBSFN RS may be transmitted in the MBSFN region of the MBSFN subframe. The MBSFN RS may be transmitted over antenna port 4 only when the PMCH is transmitted in the MBSFN subframe. A current MBSFN RS is defined only with respect to the extended CP.

MBSFN RS sequence (m) is defined by Equation 18.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 18]}$$

$$m = 0, 1, \ldots, 6N_{RB}^{max,DL} - 1$$

In Equation 18, $n_s$ denotes a slot number in a radio frame and l denotes an OFDM symbol number in the slot.

c(i) is a pseudo-random sequence defined by a length-31 Gold sequence. Output sequence c(n) (where n=0, 1, . . . , $M_{PN}-1$) of length $M_{PN}$ is defined by Equation 16.

In Equation 18, a pseudo-random sequence generator is initialized with the following value at the start of an OFDM symbol.

$$c_{init} = 2^9 \cdot (7 \cdot (n_s+1) + l + 1) \cdot (2 \cdot N_{ID}^{MBSFN} + 1) + N_{ID}^{MBSFN} \quad \text{[Equation 19]}$$

In Equation 19, $B^{MBSFN}_{ID}$ is an MBSFN area ID.

For reference, in terms of mobility, if an MBSFN area ID broadcast by a source node to which a UE is connected is the same as an MBSFN area ID broadcast by a target node to which the UE is to move, the UE recognizes that an MBSFN area is continuous.

MBSFN RS sequence $r_{l,n_s}(m')$ in OFDM symbol l is mapped to complex-valued modulation symbol $a_{k,l}^{(p)}$ according to the following equation.

$$a_{k,l}^{(p)} = r_{l,n_s}(m') \quad \text{[Equation 20]}$$

In Equation 20, p=4 and k, l, and m' are given by the following equation.

$$k = \begin{cases} 2m & \text{if } l \neq 0 \text{ and } \Delta f = 15 \text{ kHz} \\ 2m+1 & \text{if } l = 0 \text{ and } \Delta f = 15 \text{ kHz} \\ 4m & \text{if } l \neq 0 \text{ and } \Delta f = 7.5 \text{ kHz} \\ 4m+2 & \text{if } l = 0 \text{ and } \Delta f = 7.5 \text{ kHz} \end{cases} \quad \text{[Equation 21]}$$

$$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \\ 1 & \text{if } n_s \bmod 2 = 0 \text{ and } \Delta f = 7.5 \text{ kHz} \\ 0, 2 & \text{if } n_s \bmod 2 = 1 \text{ and } \Delta f = 7.5 \text{ kHz} \end{cases}$$

$$m = 0, 1, \ldots, 6N_{RB}^{DL} - 1$$

$$m' = m + 3(N_{RB}^{max,DL} - N_{RB}^{DL})$$

In Equation 21, $N^{max,DL}_{RB}$ denotes the largest DL bandwidth and is expressed by a multiple of $N^{RB}_{sc}$. According to 3GPP LTE/LTE-A standards defined up to now, $N^{max,DL}_{RB}$ = 110. $N^{DL}_{RB}$ denotes a DL bandwidth and is expressed by a multiple of $N^{RB}_{sc}$.

FIG. 12 illustrates REs for MBSFN RS transmission when Δf=15 kHz according to Equation 21.

An MBSFN used in a legacy radio communication system provides an MBSFN service using an entire system BW of a carrier in an MBSFN subframe. Then, the same MBSFN service can be provided only when system BWs of carriers used by nodes are equal and center frequencies of the carriers are equal. In the case of the legacy system, since one operator typically provides an MBSFN service using one carrier, provision of successive MBSFN services of the operator to UEs traveling coverage by nodes is not problematic. However, according to introduction of CA, one operator may use multiple carriers according to nodes and thus a method for providing the same MBSFN service using different carriers may be needed. In addition, provision of a better service to a UE is needed in a manner that different operators coordinately provide the same MBSFN service. Meanwhile, even when carriers use the same center frequency according to radio communication standards, BWs configured by the carriers may differ. In this case, a method for providing the same MBSFN service using carriers having different BWs is needed.

Hereinafter, methods for providing the same MBSFN service between cells having different system BWs and/or different center frequencies are proposed. For reference, in the present invention, if center frequencies on which cells operate differ, the cells may be different cells and, if system BWs of cells differ although center frequencies are the same, the cells may be different cells.

Embodiments of the present invention are applicable to an NCT cell as well as an LCT cell. Prior to a detailed description of the embodiments of the present invention, the NCT cell will now be described in brief.

In a radio communication system, a UE may receive data and/or a variety of control information from a BS through DL and transmit data and/or a variety of control information to the BS through UL. In order to communicate with the BS, the UE needs to establish synchronization with the BS. To this end, the UE, which is powered on from a power-off state or newly enters a cell, which is a geographic region served by the BS, performs initial cell search accompanying operation such as synchronization establishment with the BS. Upon completion of initial cell search, the UE may receive data and/or control information through a physical DL channel and transmit data and/or control information through a physical UL channel. For reasons such as cell search, maintenance of time synchronization after synchronization between the UE and the BS, correction of a frequency offset, etc., a radio communication system discussed up to now defines transmission/reception of various mandatory signals on a designated radio resource. As standards of a radio communication system have been established, the types and amount of the mandatory signals have increased. For example, in the LCT cell, physical signals/channels should be transmitted/received as described in FIGS. 1 to 7 and FIGS. 8 to 12. In other words, in the LCT cell, physical channels/signals should be configured to be carried not through an arbitrary time frequency on an arbitrary time resource but through a specific time frequency on a specific time resource according to a type of a physical channel or physical signal. For example, PDCCHs may be configured only on front OFDM symbol(s) among OFDM symbols of a DL subframe and a PDSCH cannot be configured on the front OFDM symbol(s) having the possibility that the PDCCHs are to be mapped. As another example, CRS(s) corresponding to antenna port(s) of the eNB are transmitted in every subframe on REs illustrated in FIG. 6 over all bands irrespective of a DL BW of the eNB. Then, if the number of antenna ports of the eNB is one, REs indicated by '0' in FIG. 6 cannot be used for another DL signal transmission and, if the number of antenna ports of the eNB is four, REs indicated by '0', '1', '2', and '3' in FIG. 6 cannot be used for another DL signal transmission. In addition, various constraints on the LCT cell are present and such constraints have increased according to development of the communication system. Since some of these constraints were created due to a communication technology level at that time when the constraints were made, there are unnecessary constraints according to development of communication technology. In addition, a constraint on legacy technology and a constraint on new technology for the same purpose may be simultaneously present. In this way, as constraints have significantly increased, constraints introduced for development of a communication system rather makes it difficult to efficiently use radio resources of a cell. Hence, according to development of communication technology, introduction of an NCT cell which is free from unnecessary constraints and is capable of being configured according to simpler constraints than conventional constraints has been discussed.

In the present invention, the NCT cell may not satisfy at least one of a constraint indicating that a CRS should be configured in every DL subframe in the cell, a constraint indicating that the CRS should be configured in the cell per antenna port of an eNB, and a constraint indicating that a predetermined number of front OFDM symbols of a DL subframe should be reserved for transmission of a control channel such as a PDCCH over an entire frequency band of a corresponding CC. For example, in the NCT cell, the CRS may be configured not in every subframe but in a predetermined number (>1) of subframes. Alternatively, in the NCT cell, the CRS only for one antenna port (e.g. antenna port 0) may be configured irrespective of the number of antenna ports of the eNB. Alternatively, instead of a legacy CRS for channel state measurement and demodulation, a tracking RS for tracking of time synchronization and/or frequency synchronization is newly defined and the tracking RS may be configured in some subframes and/or on some frequency resources of the NCT cell. Alternatively, a PDSCH may be configured on front OFDM symbols of the NCT cell, a PDCCH may be configured in a legacy PDSCH region rather than on the front OFDM symbols, or the PDSCH may be configured using some frequency resources of the PDCCH. Hereinafter, a CRS used only for tracking or a new RS is referred to as a tracking RS.

In CA, the NCT cell may be used as an Scell. Since the NCT cell which can be used as the Scell does not consider use by a legacy UE, the legacy UE does not need to perform cell search, cell selection, cell reselection, etc. in the NCT cell. If the NCT cell is not used as a Pcell and is used only as the Scell, the NCT cell can reduce unnecessary constraints relative to the legacy LCT cell which can also be used as the Pcell and thus cells can be more efficiently used. However, it is considered that the NCT cell is used as a stand-alone NCT cell capable of also being used as an independent Pcell in the future. If the NCT cell is introduced, since the NCT cell will be configured according to a rule different from a rule of the LCT cell, application of a method for configuring the MBSFN subframe in a legacy system to the NCT cell may be problematic.

Hereinafter, embodiments of the present invention for providing an MBSFN service will be described.

MBSFN Subframe Location in NCT Cell

In an NCT cell, a UE need to receive a PSS/SSS when necessary and to constantly receive a tracking RS for time/frequency tracking. Accordingly, a subframe in which the PSS/SS is transmitted and a subframe in which the tracking RS is transmitted cannot be used for an MBSFN subframe in the NCT cell. Especially, if the PSS/SSS is transmitted in subframes #0 and #5 and if the tracking RS is transmitted likewise in subframes #0 and #5, then subframes #0 and #5 cannot be used for the MBSFN subframe. Alternatively, if the PSS/SSS is transmitted in subframes #1 and #6 and if the tracking RS is transmitted in subframes #0 and #5, then subframes #0, #1, #5, and #6 cannot be used for the MBSFN subframe. Alternatively, if the PSS/SSS is transmitted in subframes #0, #1 and #5, #6 and if the tracking RS is transmitted in subframes #0 and #5, then subframes #0, #1, #5, and #6 cannot be used for the MBSFN subframe. If subframes capable of being used for an MBSFN are not equal in cells providing the same MBSFN service, nodes for controlling or managing the cells share information about subframes capable of being used for the MBSFN thereof to determine subframes to be used for a corresponding MBSFN service. In order to prevent the number of subframes incapable of being used as the MBSFN subframe from increasing because subframe locations in which the PSS/SSS or the tracking RS is transmitted differs in cells providing the same service, a radio frame may be configured such that the location of a subframe for the PSS/SSS (hereinafter, a PSS/SSS subframe) and/or the location of a subframe for the tracking RS (hereinafter, a tracking RS subframe) are the same in cells used for the MBSFN (hereinafter, an MBSFN cell).

B. Partial PMCH in MBSFN Subframe

Figure 13:
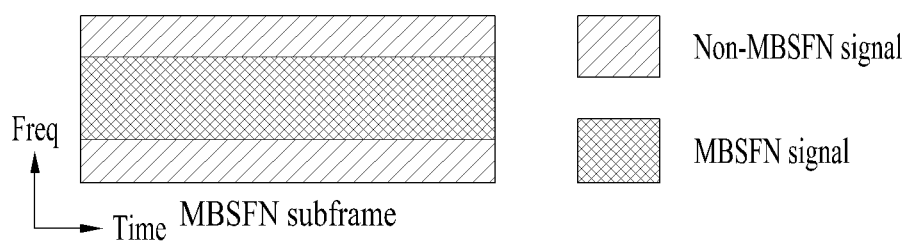
FIG. 13 illustrates a first application example of a method for configuring an MBSFN subframe for an MBSFN signal according to the present invention.

FIG. 13 illustrates a first application example of a method for configuring an MBSFN subframe for an MBSFN signal according to the present invention.

In a legacy MBSFN subframe, a PMCH can be transmitted in all RB regions of the MBSFN subframe, i.e. in all RBs. However, if all RBs of the MBSFN subframe are reserved for an MBSFN, cells having different system BWs cannot provide the same MBSFN service or all of RBs of cells having different system BWs cannot be used for transmission.

To solve the above problem, according to the present invention, an MBSFN signal may be transmitted only in a partial RB region of an MBSFN subframe. The other RB region may be used for transmission of an EPDCCH, a PHICH, and/or a PDSCH. Here, the EPDCCH refers to a PDCCH transmitted using an RB pair on OFDM symbols after OFDM symbols configured by a higher layer signal as opposed to the PDCCH of FIG. 5 which can be transmitted only on front OFDM symbol(s) in a DL subframe.

In a legacy radio communication system, if the PMCH is transmitted in an MBSFN region of an MBSFN subframe, all RBs of the MBSFN region are reserved for the PMCH and other physical channels, i.e. a non-MBSFN signal, cannot be transmitted in the MBSFN region. In contrast, according to the present invention, physical channel(s) carrying the non-MBSFN signal as well as the PMCH carrying an MBSFN signal corresponding to an MBSFN service in the MBSFN subframe may be transmitted.

The present invention proposes that N center RBs in the MBSFN subframe be used for the MBSFN signal. Referring to FIG. 13, edge RBs other than a middle RB region used for an MBSFN may be used for the non-MBSFN signal.

When N center RBs are used for the MBSFN signal transmitted in the MBSFN subframe, an MBSFN RS in the RB region in which the MBSFN signal is transmitted may be assigned by considering the lowest RB index part of the RB region as the first RB index. For example, subcarrier k starting from 0 to $N^{DL}_{RB}*N^{RB}sc-1$ is sequentially assigned to subcarriers in a system BW of a cell as described in FIG. 2 and a legacy MBSFN RS is mapped to REs having k and l satisfying Equation 21. In contrast, according to the present invention, MBSFN RS REs according to Equation 21 may be determined not under the assumption that a subcarrier index is assigned based on an entire system BW but under the assumption that subcarrier indexes 0 to M−1 are assigned starting from a subcarrier of the lowest index among subcarriers of an RB of the lowest index to a subcarrier of the highest index among subcarriers of an RB of the highest index, among RB(s) configured for the MBSFN service. Here, $M=N*N^{RB}sc$ and N is the number of RBs in the RB region for the MBSFN. That is, an eNB may map the MBSFN RS by regarding the lowest frequency index in a frequency region configured for the MBSFN as the first frequency index '0' and a UE may receive the MBSFN RS by assuming that the lowest frequency index in the frequency region configured for the MBSFN is first frequency index '0'.

Alternatively, when N center RBs are used for the MBSFN signal transmitted in the MBSFN subframe, the MBSFN RS in an RB region in which the MBSFN signal is transmitted may be used by assigning a 20 MHz MBSFN RS based on a DC carrier (i.e. center frequency) and then puncturing an MBSFN RS sequence of a part deviating from a system BW and an RB region not used for the MBSFN signal. For example, the MBSFN RS may be mapped according to Equation 21 but the mapped MBSFN RS may be punctured in RBs not configured as an RB region for the MBSFN signal and the punctured MBSFN RS may not be transmitted. Other channels or signals may be transmitted on REs of the punctured MBSFN RS.

In the present invention, the RB region which is to be used for the MBSFN signal in the MBSFN subframe may be configured by the eNB. When necessary, signals such as a UE-RS, CSI-RS, etc. may be transmitted in an RB region in which the non-MBSFN signal in the MBSFN subframe is transmitted.

Figure 14:
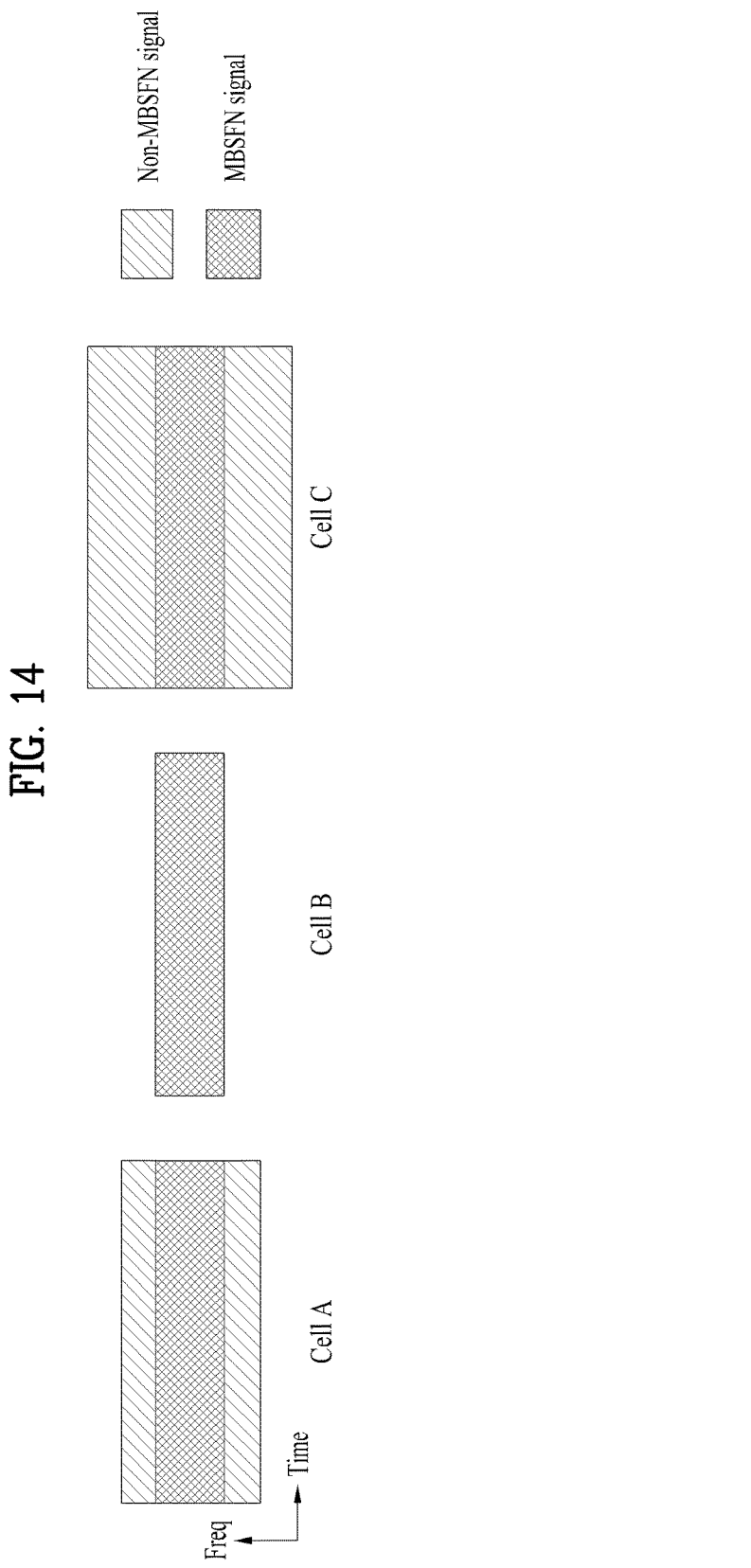
FIG. 14 illustrates a second application example of a method for configuring an MBSFN subframe for an MBSFN signal according to the present invention.

FIG. 14 illustrates a second application example of a method for configuring an MBSFN subframe for an MBSFN signal according to the present invention.

When cells providing the same MBSFN service, i.e. cells used to transmit the same MBSFN service, have different system BWs, the number of RBs used for the MBSFN service in the MBSFN subframe may be equal to or less than the lowest value among the numbers of RBs of system BWs of the respective cells. Referring to FIG. 14, when there are cell A, cell B, and cell C having different system BWs and cell A, cell B, and cell C all provide the same MBSFN service, the number of RBs for transmission of the MBSFN service in the MBSFN subframe may be set to a value equal to or less than the number of RBs of cell B having the smallest system BW. If the number of RBs for transmission of the MBSFN service in the MBSFN subframe is the same as the number of RBs of cell B, the remaining RB region of cell A and the remaining RB region of cell c may be used to transmit the non-MBSFN signal.

C. MBSFN Signal in Non-MBSFN Subframe

The present invention proposes transmitting an MBSFN signal not only in an MBSFN subframe but also in a non-MBSFN subframe in an NCT cell. In the LCT cell, the MBSFN signal is capable of being transmitted only in a subframe reserved for an MBSFN. Since the NCT cell is a newly defined cell configurable without conforming to such a constraint of the LCT cell, the constraint indicating that the MBSFN subframe is preconfigured by a higher layer signal for an MBSFN service in the NCT cell may be released. Notably, non-MBSFN subframes of the NCT cell include a subframe with a tracking RS and a subframe without the tracking RS.

Figure 15:
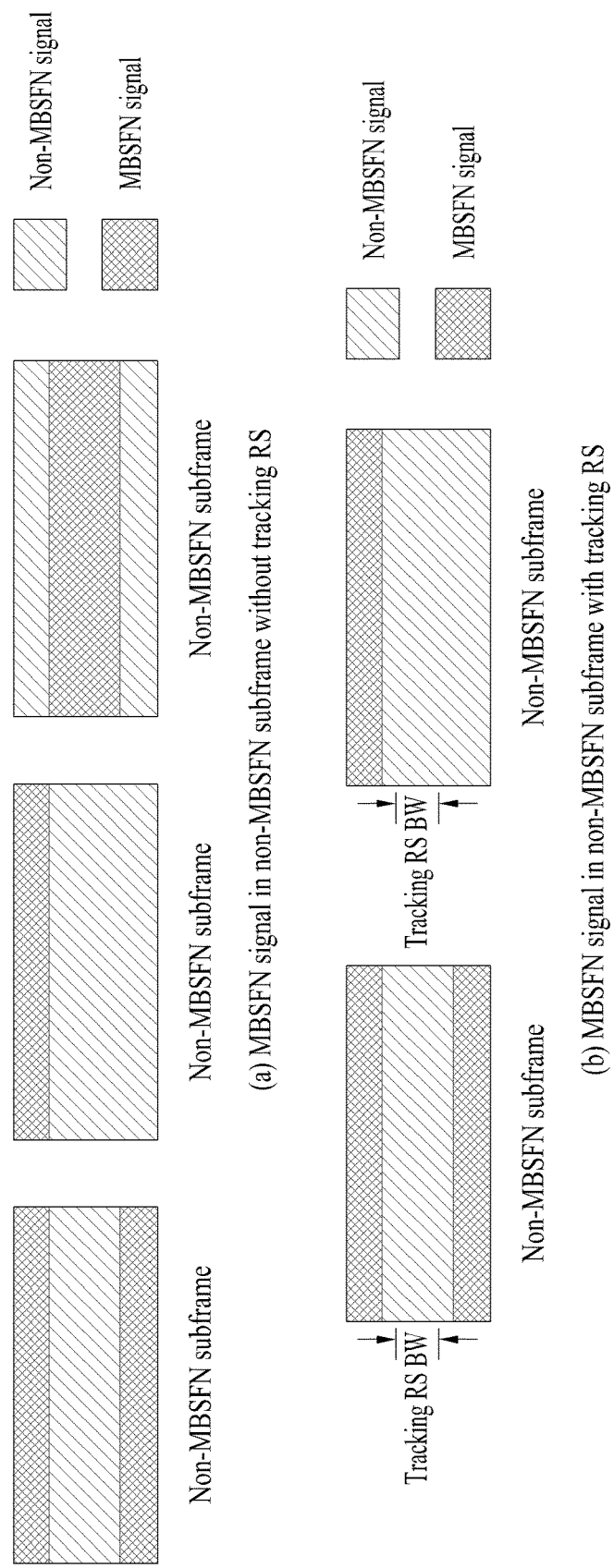
FIG. 15 illustrates a third application example of a method for configuring an MBSFN subframe for an MBSFN signal according to the present invention.

FIG. 15 illustrates a third application example of a method for configuring an MBSFN subframe for an MBSFN signal according to the present invention.

FIG. 15(a) illustrates an MBSFN signal in a non-MBSFN subframe in which a tracking RS is not transmitted. Referring to FIG. 15(a), the MBSFN signal may be present in an edge region except for a middle RB region, in a partial RB region, or in the middle RB region of the non-MBSFN subframe in which the tracking RS is not transmitted among non-MBSFN subframes.

FIG. 15(b) illustrates an MBSFN signal in a non-MBSFN subframe in which a tracking RS is transmitted. Referring to FIG. 15(b), when the tracking RS is transmitted only through a partial BW region (hereinafter, a tracking RS BW), the MBSFN signal may be transmitted in the other RB region except for the tracking RS BW. For instance, the MBSFN signal may be transmitted in a partial RB region among regions except for the tracking RS BW as illustrated in FIG. 15(b).

In this case, the MBSFN RS may be transmitted in an RB region in which the MBSFN signal is transmitted in the non-MBSFN subframe and the MBSFN RS cannot be transmitted in an RB region in which the non-MBSFN signal is transmitted. A CSI-RS or a UE-RS cannot be transmitted in an RB region in which the MBSFN signal is transmitted in the non-MBSFN subframe and the CSI-RS or the UE-RS can be transmitted only in the RB region in which the non-MBSFN signal is transmitted.

In order to transmit the MBSFN signal in the non-MBSFN subframe, a related cell may be determined to use an extended CP. That is, if a partial BW of a cell is configured for the MBSFN signal in the non-MBSFN subframe, the extended CP may be used in the non-MBSFN subframe of the cell.

Unlike this, the extended CP may be used irrespective of the length of a CP used in the cell in an RB region in which the MBSFN signal is transmitted in the non-MBSFN subframe. In other words, the extended CP is identically used over an entire DL system BW in a legacy MBSFN subframe and the same CP as a CP of subframe #0 is used in a legacy non-MBSFN subframe, whereas the extended CP may be determined to be used only in an RB region in which the MBSFN signal is transmitted regardless of the length of the CP of subframe #0 of the cell. Namely, the extended CP may be used in an RB region configured for the MBSFN signal in a subframe area including the MBSFN signal even though a normal CP is generally used in subframes of a cell.

Consequently, according to the present invention, the extended CP is used in RB(s) at least for the MBSFN signal.

In summary, the present invention proposes transmitting the MBSFN signal in any subframe without separately designating an MBSFN subframe or transmitting the MBSFN signal in any subframe except for a subframe in which the PSS/SSS/tracking RS is transmitted. In this case, the MBSFN signal may be transmitted only in a partial frequency region of one subframe. When the PSS/SSS is transmitted in the subframe, the MBSFN signal may be transmitted through a frequency region other than an RB region in which the RSS/SSS is transmitted. When the tracking RS is transmitted through a partial BW in the subframe, the MBSFN signal may be transmitted through a frequency region other than an RB region in which the tracking RS is transmitted.

D. Frequency Division Multiplexing (FDM) in MBSFN Subframe

According to the present invention, since a partial BW of an entire DL system BW of a cell may be used for an MBSFN service, a DL system BW of one cell may be used to transmit multiple MBSFN signals. In other words, multiple MBSFN signals may be simultaneously transmitted in one MBSFN subframe by an FDM scheme.

Figure 16:
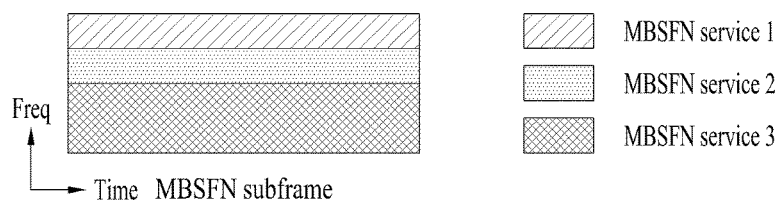
FIG. 16 illustrates a fourth application example of a method for configuring an MBSFN subframe for an MBSFN signal according to the present invention.

FIG. 16 illustrates a fourth application example of a method for configuring an MBSFN subframe for an MBSFN signal according to the present invention.

MBSFN signals for different MBSFN services in one MBSFN subframe may be simultaneously transmitted in different frequency regions (or RB regions). Referring to FIG. 16, MBSFN service 1, MBSFN service 2, and MBSFN service 3 may be provided in different frequency regions (or RB regions) in the same MBSFN subframe. In a communication system defined up to now, the number of MBSFN areas which can be identified at a time by the UE is a maximum of 8. That is, in a current communication system, since a maximum of 8 MBSFN services can be simultaneously transmitted by one eNB, the number of MBSFN services which can be simultaneously transmitted in one MBSFN subframe may be up to 8.

E. Start Symbol Location of MBSFN Signal

The location of an OFDM symbol at which an MBSFN signal is started in one subframe may be fixed or may be configurable. That is, the MBSFN signal may be transmitted starting from a specific OFDM symbol. In this case, the location of the OFDM symbol at which transmission of the MBSFN signal is started may be identically designated in every subframe or may be differently designated in every subframe. For example, the location of the OFDM symbol on which transmission of an MBSFN signal is started in each subframe may be equal or different with respect to N subframes in which the MBSFN signal is transmitted and the location of the OFDM symbol may be fixedly used or may be designated/changed by configuration by a higher layer signal, for example, radio resource control (RRC) configuration.

The present invention proposes an MBSFN RS transmission method for the case in which the location of an OFDM symbol at which transmission of the MBSFN signal is started may always be not OFDM symbol #0.

The present invention proposes that the location of the MBSFN RS be differently shifted according to the OFDM symbol start location of the MBSFN signal. Referring to FIG. 12, a current MBSFN RS is transmitted on OFDM symbol #2 of an even-numbered slot and OFDM symbols #0 and #4 of odd-numbered slot. That is, the current MBSFN RS is transmitted on OFDM symbols #2, #6, and #10 among OFDM symbols #0 to #11 in the MBSFN subframe.

The present invention proposes transmitting the first OFDM symbol of the MBSFN RS on OFDM symbol #n when the start location of the OFDM symbol of the MBSFN signal is OFDM symbol #n. For example, if the OFDM symbol start location of the MBSFN signal is OFDM symbol #n, the MBSFN RS is transmitted on OFDM symbols #n, #n+4, and #n+8. In this case, if an index of an OFDM symbol on which the MBSFN RS is to be transmitted is greater than or equal to the number of OFDM symbols in one subframe, the MBSFN RS is not transmitted on a corresponding OFDM symbol.

The present invention proposes that, when the OFDM symbol start location of the MBSFN signal is OFDM symbol #n, if #n is equal to or greater than OFDM symbol #2, the OFDM symbol, i.e. OFDM symbol #n, correspond to the first OFDM symbol of the MBSFN RS and, if not, OFDM symbol #2 correspond to the first OFDM symbol of the MBSFN RS. In other words, in the present invention, when the OFDM symbol start location of the MBSFN signal is OFDM symbol #n, if n is equal to or greater than OFDM symbol #2, the MBSFN RS may be transmitted on OFDM symbols #n, #n+4, and #n+8 and, if not, the MBSFN RS may be transmitted on OFDM symbols #2, #6, and #10. In this case, if an index of an OFDM symbol on which the MBSFN RS is to be transmitted is greater than or equal to the number of OFDM symbols in one subframe, the MBSFN RS is not transmitted on a corresponding OFDM symbol.

The present invention proposes that an MBSFN RS located on an OFDM symbol on which the MBSFN signal is not transmitted be punctured and then transmitted. Especially, in the proposal of the present invention, the location of the MBSFN RS on an OFDM symbol is fixed to OFDM symbols #2, #6, and #10 but the MBSFN RS located on an OFDM symbol on which the MBSFN signal is not transmitted is punctured and then transmitted. For example, although the MBSFN RS can be transmitted only on some predetermined OFDM symbols, the MBSFN RS may be mapped not to the predetermined OFDM symbols but to specific OFDM symbols. In this case, the MBSFN RS mapped not to the predetermined OFDM symbol but to the specific OFDM symbols may be punctured and, as a result, the MBSFN RS may not be transmitted on the specific OFDM symbols. In this case, REs on which the MBSFN RS is punctured on the specific OFDM symbols may be used for other signals or channels.

F. RS for MBSFN Signal

The present invention proposes that a UE-RS be transmitted in an MBSFN subframe or a region in which an MBSFN signal is transmitted and the UE demodulate the MBSFN signal through the UE-RS. Alternatively, the present invention proposes using an MBSFN RS or a UE-RS as an RS for the MBSFN signal. Which one of the MBSFN RS and the UE-RS will be used as the RS for the MBSFN signal may be configured in the unit of a subframe. As an example, the MBSFN RS may used as the RS for the MBSFN signal in a region or a subframe in which an LCT cell and an NCT cell transmit the same MBSFN signal and the UE-RS may be used as the RS for the MBSFN signal in a region or a subframe in which only the NCT cell transmits the MBSFN signal.

The sequence and location of the UE-RS used as the RS for the MBSFN signal may be MBSFN service specifically determined. That is, the UE-RS used for an MBSFN service in an MBSFN region may be generated by replacing $N^{cell}_{ID}$ used for sequence generation and frequency shift of the UE-RS for the PDSCH, described with reference to Equations 12 to 17, with $N^{MBSFN}_{ID}$.

The UE-RS for the MBSFN service may be transmitted through a new antenna port or through an antenna port over which a legacy MBSFN RS is transmitted or may be transmitted through one of antenna ports over which a legacy UE-RS is transmitted.

G. MBSFN Service Between Cells Having Different BWs

The present invention proposes that a cell transmitting an MBSFN signal transmit the MBSFN signal only in a partial RB region in one MBSFN subframe or a non-MBSFN subframe in order to provide the same MBSFN service in cells having different system BWs. The MBSFN signal transmitted in one subframe may be transmitted using a specific RB region based on a center frequency of a BW region in one cell. To this end, a cell needs to inform the UE of a BW used for MBSFN transmission based on the center frequency. Alternatively, the MBSFN signal transmitted in one subframe may be transmitted through a specific RB region in one cell. For this, a node providing an MBSFN service needs to inform the UE of an RB region used for MBSFN transmission among RBs in a cell for the MBSFN service.

Figure 17:
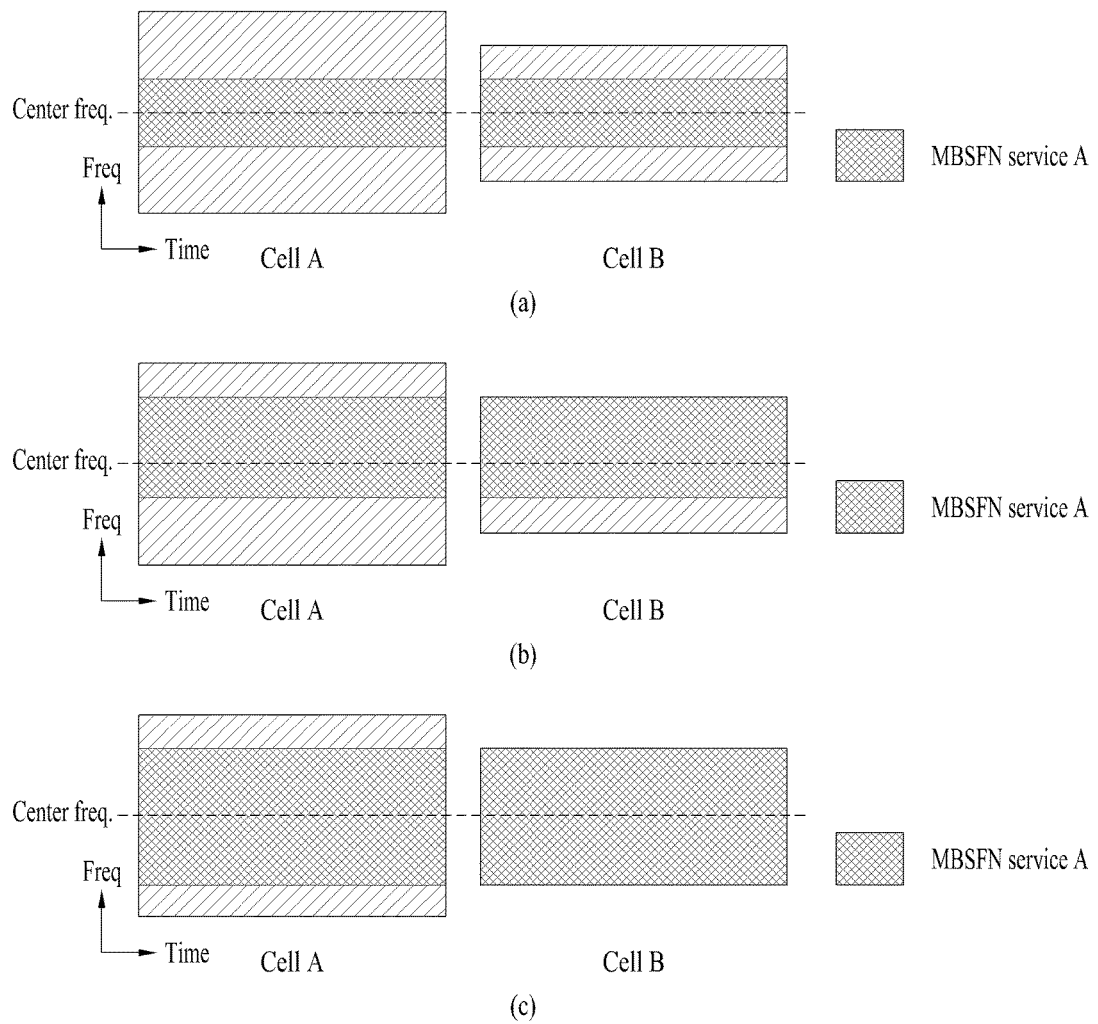
FIG. 17 illustrates a fifth application example of a method for configuring an MBSFN subframe for an MBSFN signal according to the present invention.

FIG. 17 illustrates a fifth application example of a method for configuring an MBSFN subframe for an MBSFN signal according to the present invention. Especially, FIG. 17 illustrates a method for configuring an MBSFN service transmission (frequency) region in order to provide the same MBSFN service in cells having different system BWs. In order to provide the same MBSFN service in cells having the same center frequency and different system BWs, a specific BW may be used for the MBSFN service based on the center frequency as in FIG. 17(a). In this case, a BW region for an MBSFN should be equal to or less than a minimum BW of system BWs of the cells providing the same service as described in FIG. 14. To this end, information about the system BWs of the cells providing the same MBSFN service is shared by node(s) using the cells and information about a system BW of each cell or information about the smallest system BW among the system BWs of the cells is shared by node(s) providing the same MBSFN service using the cells. Next, the node(s) providing the same MBSFN service determines a BW region from the center frequency of a related cell for the MBSFN service and share the BW region with other node(s) which are to provide the same MBSFN service. A node of each cell informs the UE, through a broadcast message, of information about the BW region from the center frequency, in which the MBSFN service is to be provided. The MBSFN RS is transmitted in an RB region in which the MBSFN signal is transmitted and the MBSFN RS may be assigned by regarding the lowest RB index of the RB region in which the MBSFN signal is transmitted as an index of the first frequency region. As an example, when N center RBs are used for the MBSFN signal transmitted in the MBSFN subframe as described earlier with reference to FIG. 13, MBSFN RS REs may be determined under the assumption that subcarrier indexes 0 to N−1 are assigned starting from a subcarrier of the lowest index among subcarriers of an RB of the lowest index to a subcarrier of the highest index among subcarriers of an RB of the highest index, among RB(s) configured for the MBSFN service. Here, $M=N*N^{RB}_{sc}$ and N is the number of RBs in an RB region for an MBSFN. That is, the eNB may map the MBSFN RS by regarding the lowest frequency index in a frequency region configured for the MBSFN as first frequency index '0' and the UE may receive the MBSFN RS by assuming that the lowest frequency index in a frequency region configured for the MBSFN is first frequency index '0'.

Alternatively, the MBSFN RS in a region in which the MBSFN signal is transmitted may be used by assigning an MBSFN RS of a size of 20 MHz (or specific BW size) based on a DC carrier (a center frequency) and then puncturing an MBSFN RS sequence of a part deviating from a system BW and an RB region not used for the MBSFN signal. For example, the MBSFN RS may be mapped according to Equation 21 but the mapped MBSFN RS may be punctured in RBs not configured as an RB region for the MBSFN signal and the punctured MBSFN RS may not be transmitted, as described previously with reference to FIG. 13.

To transmit the same MBSFN service in cells having the same center frequency and having different system BWs, a specific RB region may be used for the MBSFN service as in FIG. 17(b). In this case, the RB region for the MBSFN may be defined as a frequency region which is within system BWs of all cells providing the same service and is capable of being commonly used by all cells providing the same service. To this end, information about the system BWs of the cells providing the same MBSFN service may be shared and information about a system BW of each cell or information about the smallest system BW among the system BWs of the cells may be shared, by nodes using the cells. Next, an RB region in which the MBSFN service is to be provided to each of the cells is determined and the RB region may be shared by the nodes of the cells. A node of each cell may inform the UE of information about the RB region for the MBSFN signal through a broadcast message. Then, the UE may receive the same MBSFN service using the cells having different BWs.

As described earlier with reference to FIG. 13, the MBSFN RS may be transmitted in an RB region configured for the MBSFN signal and the MBSFN RS may be assigned by regarding the lowest RB index of the RB region for the MBSFN signal as the first frequency index. That is, the eNB may map the MBSFN RS by regarding the lowest frequency index in a frequency region configured for the MBSFN as first frequency index '0' and the UE may receive the MBSFN RS by assuming that the lowest frequency index in the frequency region configured for the MBSFN is first frequency index '0'.

Alternatively, as described earlier with reference to FIG. 13, the MBSFN RS in the region in which the MBSFN signal is transmitted may be used by assigning the MBSFN RS of a size of 20 MHz (or specific BW size) based on a DC carrier (center frequency) to the MBSFN subframe and then puncturing an MBSFN RS of a part deviating from a system BW and an RB region not used as the MBSFN signal.

In order to provide the same MBSFN service in cells having the same center frequency and having different system BWs, an entire frequency region in which the cells overlap may be used for the MBSFN service as illustrated in FIG. 17(c). For example, when cell A, cell B, and cell C having different system BWs are present and cell A, cell B, and cell C all provide the same MBSFN service, a frequency region in which the MBSFN service is transmitted in an MBSFN subframe may be set to be the same as a frequency transmission region of a cell having the smallest system BW. Referring to FIG. 17(c), when cell A and cell B provide the same MBSFN service, cell A carries the MBSFN signal only in a partial frequency region corresponding to a system BW of cell B, whereas cell B carries the MBSFN signal in an entire RB region because cell B has a system BW less than a system BW of cell A. Nodes of the cells may share information about the system BWs of the cells and share information about a system BW of each cell or information about the smallest system BW among system BWs of the cells, so that an overlapping frequency region of cells used for provision of the same MBSFN service may be configured for the MBSFN service. A node of each cell may inform the UE of information (or BW information) about an RB region in which the MBSFN signal is transmitted through a broadcast message. As described previously with reference to FIG. 13, the MBSFN RS is transmitted in a frequency region configured for the MBSFN signal and the MBSFN RS may be assigned by regarding the lowest RB index of the RB region in which the MBSFN signal is transmitted as the first frequency index.

Alternatively, as described previously with reference to FIG. 13, the MBSFN RS in the region in which the MBSFN signal is transmitted may be used by assigning an MBSFN RS of a size of 20 MHz (or specific BW size) based on a DC carrier (center frequency) and then puncturing an MBSFN RS of a part deviating from a system BW and a frequency region not used for the MBSFN signal.

H. MBSFN Service Between Cells Having Different Center Frequency Locations

In the present invention, an MBSFN signal may be transmitted only in a partial RB region of a cell used for transmission of the MBSFN signal so as to provide the same MBSFN service in two or more cells having the same or different system BW(s) and having different center frequencies.

Figure 18:
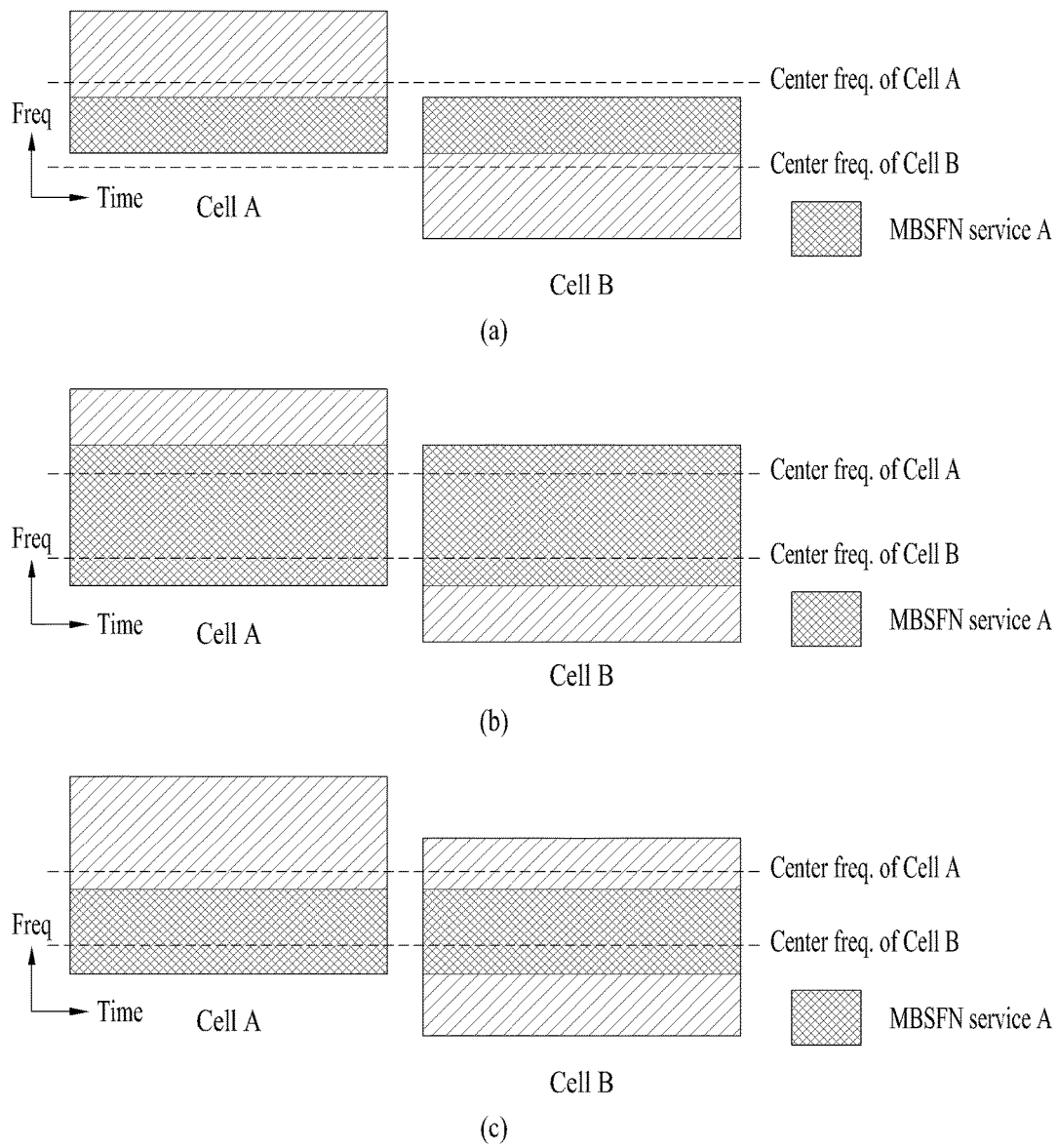
FIGS. 18 and 19 illustrate a sixth application example of a method for configuring an MBSFN subframe for an MBSFN signal according to the present invention.
Figure 19:
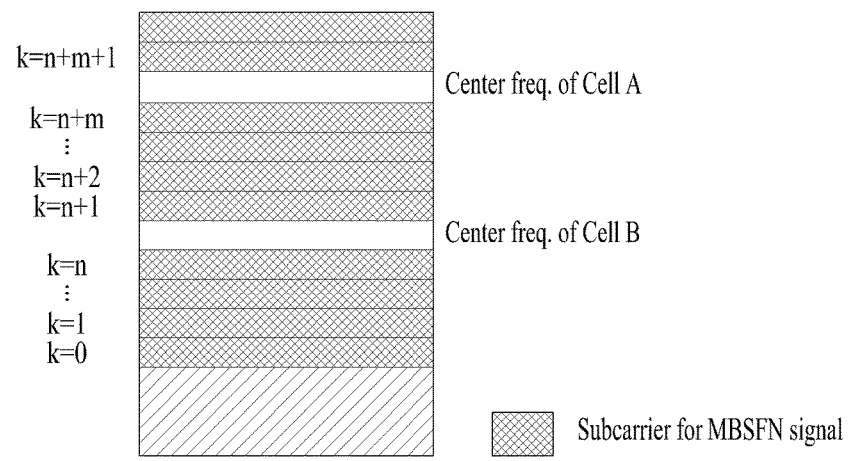

FIGS. 18 and 19 illustrate a sixth application example of a method for configuring an MBSFN subframe for an MBSFN signal according to the present invention. Especially, FIG. 18 illustrates a method for configuring an MBSFN service transmission region in order to transmit the same MBSFN service in two or cells having different center frequencies.

In order to transmit the same MBSFN service in two or more cells having different center frequencies, the MBSFN signal may be transmitted through an overlapping frequency region of the two or more cells. Referring to FIG. 18, when cell A and cell B providing the same MBSFN service are present and center frequencies of cell A and cell B differ, the MBSFN signal may be transmitted through an overlapping frequency region among frequency regions of cell A and cell B.

FIG. 18(a) illustrates an example of MBSFN signal transmission regions configured respectively for cell A and cell B when center frequencies of cell A and cell B differ. Referring to FIG. 18(a), a frequency region which can be commonly used for the MBSFN service is present in cell A and cell B and the frequency region may not include a center frequency (DC carrier) of each cell. In FIG. 18(a), all or a partial frequency region of the overlapping frequency region in cell A and cell B may be used to transmit the MBSFN signal. To this end, nodes of cells providing the same MBSFN service may be aware of a frequency region which can be commonly used for the MBSFN service in the cells by sharing information about center frequencies used by the cells and the system BWs of the cells. Next, each node may determine an RB region used for the MBSFN service in a corresponding cell and share the region with other node(s). If an entire frequency region which can be commonly used for the MBSFN service in the cells, i.e. if an entire frequency region overlapping between the cells, are used for transmission of the MBSFN signal, the procedure for determining the RB region for the MBSFN service for each cell and sharing information about the RB region with nodes of other cells may be omitted. A node of each cell may inform the UE of information about the RB region for the MBSFN signal through a broadcast message.

The MBSFN RS may be transmitted in a frequency region in which the MBSFN signal is transmitted. As described earlier with reference to FIG. 13, the MBSFN RS may be assigned by regarding the lowest RB index of the RB region in which the MBSFN signal is transmitted as the first frequency region index.

FIG. 18(b) and FIG. 18(c) also illustrate an example of MBSFN signal transmission regions configured respectively for cell A and cell B when center frequencies of cell A and cell B differ. Unlike FIG. 18(a), FIG. 18(b) and FIG. 18(c) illustrate the case in which a center frequency (DC carrier) of cell A and/or a center frequency (DC carrier) of cell B are included in a frequency region which can be commonly used in cell A and cell B. Similarly to FIG. 18(a), all or a partial frequency region of an overlapping frequency region of cell A and cell B may be used for transmission of the MBSFN signal even in FIGS. 18(b) and 18(c). In this case, the frequency region for transmission of the MBSFN signal may be configured to include both the center frequency of cell A and the center frequency of cell B as illustrated in FIG. 18(b) or may be configured to include some of the center frequency of cell A and the center frequency of cell B as illustrated in FIG. 18(b).

In order to transmit the same MBSFN service in two or more cells having the same or different system BWs and different center frequencies, nodes providing the same MBSFN service may obtain information about a frequency region usable for the MBSFN service by sharing center frequencies and system BWs of cells usable for transmission of the MBSFN service. Next, a node which is to provide the MBSFN service may determine an RB region in which the MBSFN service is provided in a cell of the node and share information about the RB region with other nodes. However, if an entire overlapping frequency region of cells used for transmission of the MBSFN service is predetermined to be always used for the MBSFN service, the procedure for determining the RB region and sharing the information about the determined RB region may be omitted. A node of each cell may inform the UE of the information about the RB region for the MBSFN signal through a broadcast message. Further, the node of each cell may inform the UE, through the broadcast message, of information about the RB region in which the MBSFN signal is transmitted and the locations of center frequencies (DC carriers) of cells providing the same service. In this case, the node of each cell may transmit, to the UE, the information about the locations of all center frequencies (DC carriers) of cell(s) providing the same MBSFN service, except for a center frequency of a cell thereof, regardless of the RB region in which the MBSFN signal is transmitted, or transmit only information about center frequency/frequencies (DC carrier(s)) of cell(s) included in the RB region configured for the MBSFN signal, except for the center frequency of a cell thereof. For example, referring to FIG. 18(b), a node of cell A may transmit information about the center frequency of cell B to the UE and the node of cell B may transmit information about the center frequency of cell A to the UE. As another example, referring to FIG. 18(c), the node of cell A may transmit information about the center frequency (DC carrier) of cell B to the UE and the node of cell B may or may not transmit information about the center frequency of cell A to the UE because center frequencies of other cells are not included in a frequency region configured for the MBSFN signal. Signals are preferably not transmitted in the center frequency (DC carrier) of each cell. In other words, if cells having different center frequencies are used for transmission of the same MBSFN service, a subcarrier corresponding to a center frequency (DC carrier) of each cell is preferably not used to transmit the MBSFN signal. Accordingly, the present invention proposes transmitting information about center frequencies (DC carriers) of other cells used for transmission of the same MBSFN service to a UE connected to each cell, when the same MBSFN service is transmitted using cells having different center frequencies.

An MBSFN RS may be transmitted in a frequency region in which an MBSFN signal is transmitted. As described earlier with reference to FIG. 13, the MBSFN RS may be assigned by regarding the lowest RB index of an RB region in which the MBSFN signal is transmitted as the first frequency region index. In this case, the MBSFN RS may be assigned without regarding carriers (or subcarriers) corresponding to center frequencies (DC carriers) of cells providing the same MBSFN service as an RB region configured for the MBSFN service. This may be understood as meaning that index k in the frequency domain is assigned to subcarriers except for a subcarrier corresponding to a center frequency of a corresponding cell and for subcarriers corresponding to center frequencies of other cells. For example, referring to FIG. 19, when the MBSFN RS is assigned to a frequency region configured for the MBSFN signal, index k for the MBSFN RS in the frequency domain is sequentially assigned from '0' starting from a subcarrier of the lowest index for MBSFN transmission and the MBSFN RS may be mapped to the frequency region for the MBSFN service under the assumption that an index is not assigned to a subcarrier corresponding to a center frequency of each cell. That is, the eNB may map the MBSFN RS by regarding the lowest frequency index in the frequency region configured for the MBSFN as first frequency index '0' and the UE may receive the MBSFN RS by assuming that the lowest frequency index in the frequency region configured for the MBSFN is first frequency index '0'.

Referring to FIG. 2, $N^{DL}_{RB} * N^{RB}_{sc}$ subcarriers constituting the frequency domain of a resource grid on a specific cell configured for the UE do not include a subcarrier corresponding to a center frequency of the specific cell and subcarrier index k is sequentially assigned to subcarriers except for the subcarrier corresponding to the center frequency. Even when a frequency resource of the specific cell configured for the UE includes subcarriers corresponding to center frequencies of other cells, a subcarrier index assigned in terms of the specific cell is present in principle even on the subcarriers corresponding to the center frequencies of the other cells. However, according to the present invention, an MBSFN signal and/or an MBSFN RS may be mapped to a frequency region configured for an MBSFN by assuming that frequency indexes are newly assigned to subcarriers of a frequency region configured for an MBSFN service. For example, when center frequencies of other cells are included in the frequency region of a specific cell configured for the MBSFN service, in the present invention, subcarrier indexes in the frequency region of the specific cell are sequentially assigned from the lowest subcarrier to the highest subcarrier of the frequency region, except for the subcarrier of the center frequency of the specific cell and the subcarriers corresponding to the center frequencies of the other cells. For example, the MBSFN RS may be mapped to the frequency region configured for the MBSFN according to Equation 21 under the assumption that k of Equation 21 is assigned based not on an entire DL BW but on an MBSFN frequency region, except for the subcarrier of the center frequency of the specific cell and the subcarriers corresponding to the center frequencies of the other cells.

Figure 20:
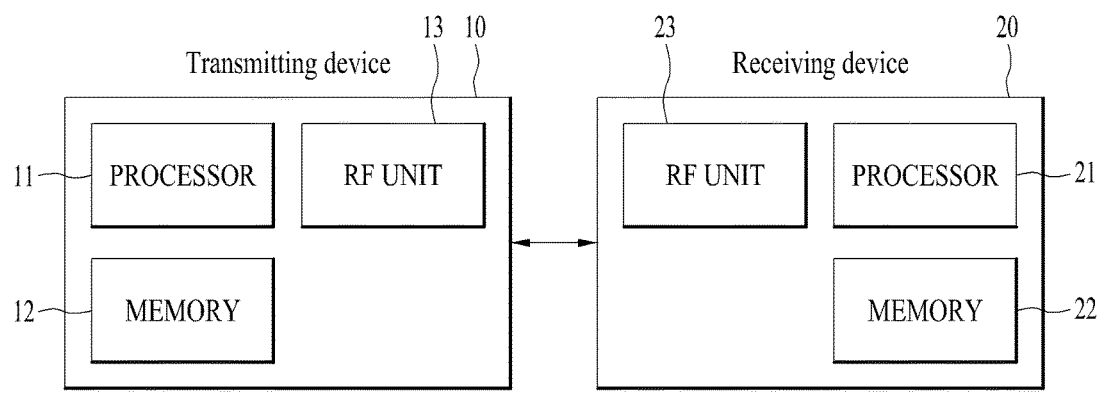
FIG. 20 is a block diagram illustrating elements of a transmitting device 10 and a receiving device 20 for implementing the present invention.

FIG. 20 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

To provide the same MBSFN service in two or more cells having different system BWs or the same center frequency, having the same system BW and different center frequencies, or having different system BWs and different center frequencies, the eNB processor of the present invention may configure only a partial frequency region of a system BW of a cell used by the eNB for the MBSFN service as a frequency resource for an MBSFN. The cells providing the same MBSFN service may be cells used by different nodes managed by the same eNB or may be cells used by different eNBs.

The eNB processor may control the eNB RF unit to transmit information about the frequency region configured for an MBSFN service out of a DL system BW of a specific cell for UE(s) connected to the specific cell of the eNB. The eNB processor may generate a higher layer signal carrying information about the number and/or locations of RBs in the frequency region as information about the frequency region (hereinafter, an MBSFN frequency region) and control the eNB RF unit to transmit the higher layer signal. When center frequencies of cells used for the same MBSFN service differ, the eNB processor may generate the higher layer signal including information about center frequencies of cells other than the center frequency of the specific cell and control the eNB RF unit to transmit the higher layer signal. The higher layer signal may be generated to include the center frequencies of other cells when the MBSFN frequency region of the specific cell includes subcarriers corresponding to the center frequencies of the other cells.

The eNB processor may control the eNB RF unit to transmit the MBSFN service in the MBSFN frequency region in an MBSFN subframe. The eNB RF unit may use the other frequency resources except for the MBSFN frequency region out of a DL system BW of the specific cell to transmit a non-MBSFN signal. In other words, the eNB processor may control the eNB RF unit to transmit the MBSFN service in the MBSFN frequency region of the specific cell and to transmit the non-MBSFN signal in a frequency region other than the MBSFN frequency region of the specific cell (hereinafter, a non-MBSFN frequency region), during the MBSFN subframe. The eNB processor may not map an MBSFN signal in subcarrier(s) corresponding to the center frequency of the specific cell and the center frequencies of other cells in the MBSFN frequency region of the specific cell.

The eNB processor may control the eNB RF unit to transmit the MBSFN RS in the MBSFN frequency region. Assuming that the MBSFN frequency region includes N RBs, the eNB processor may assign the MBSFN RS by regarding the lowest RB index part in the MBSFN frequency region as the first RB index. For example, the eNB processor of the present invention maps the MBSFN RS according to Equation 21 to the MBSFN frequency region, not under the assumption that subcarrier indexes are assigned based on an entire system BW but under the assumption that subcarrier indexes 0 to M−1 are assigned starting from a subcarrier of the lowest index of an RB of the lowest index to a subcarrier of the highest index of an RB of the highest index, among RB(s) in the MBSFN frequency region. Here, $M=N*N^{RB}sc$ and N is the number of RBs in an RB region for the MBSFN.

Alternatively, the eNB processor may assign a 20 MHz MBSFN RS based on the center frequency of the specific cell and then puncture an MBSFN RS assigned to a part deviating from the system BW and the non-MBSFN frequency region.

When a subcarrier corresponding to the center frequency of the specific cell and/or subcarriers of center frequencies of other cells providing the same MBSFN service are included in the MBSFN frequency region, the eNB processor may map the MBSFN signal and the MBSFN RS by considering subcarrier(s) corresponding to center frequencies of the specific cell and/or other cells as not being included in the frequency region. For example, the eNB processor may map the MBSFN RS to the MBSFN frequency region under the assumption that subcarrier indexes from '0' are sequentially newly assigned based on the MBSFN frequency region to subcarriers in the MBSFN frequency region of the specific cell. If the center frequency of the specific cell and/or the center frequencies of other cells are included in the MBSFN frequency region, the eNB processor may map the MBSFN RS by regarding the subcarrier indexes as not being assigned to subcarriers corresponding to the center frequencies.

The UE RF unit receives information about an MBSFN frequency region configured for an MBSFN service out of a DL system BW of a cell configured for the UE (hereinafter, a specific cell) and transmits the information to the UE processor. The UE processor may be aware of the number of RBs in the MBSFN frequency region and/or the location of the MBSFN frequency region in the DL system BW of the specific cell, based on the MBSFN frequency region information. The UE processor may receive an MBSFN service in the MBSFN frequency region based on the MBSFN frequency region information. The UE processor may receive a non-MBSFN signal in a non-MBSFN frequency region of the cell. For example, the UE processor may control the UE RF unit to receive DCI through an EPDCCH or receive a DL data signal through a PDSCH, in the non-MBSFN frequency region. When center frequencies of cells used for the same MBSFN service differ, the UE RF unit may further receive information about center frequencies of cells other than the specific cell. The UE processor may not use a frequency resource corresponding to the center frequencies of the other cells for the MBSFN service and/or reception of an MBSFN RS based on the information about the center frequencies of the other cells.

The UE processor may control the UE RF unit to receive the MBSFN signal in the MBSFN frequency region and demodulate or decode the MBSFN signal by assuming that the MBSFN signal is not mapped to subcarrier(s) corresponding the center frequency of the specific cell and the center frequencies of the other cell in the MBSFN frequency region of the specific cell.

The UE processor may control the UE RF unit to receive the MBSFN RS in the MBSFN frequency region of the specific cell. Assuming that the MBSFN frequency region includes N RBs, the UE processor may detect the MBSFN RS by regarding the lowest RB index part in the MBSFN frequency region as the first RB index. For example, the UE processor of the present invention may detect the MBSFN RS in the MBSFN frequency region by assuming that subcarrier indexes 0 to M−1 are assigned starting from a subcarrier of the lowest index of an RB of the lowest index to a subcarrier of the highest index of an RB of the highest index, among RB(s) in the MBSFN frequency region, instead of mapping the MBSFN RS according to Equation 21 to the MBSFN frequency region under the assumption that the subcarrier indexes are assigned based on an entire system BW. Here, $M=N*N^{RB}sc$ and N is the number of RBs in an RB region for the MBSFN.

Alternatively, the UE processor may detect the MBSFN RS by assigning a 20 MHz MBSFN RS based on the center frequency of the specific cell and then puncturing an MBSFN RS assigned to a part deviating from the system BW and the non-MBSFN frequency region.

When a subcarrier corresponding to the center frequency of the specific cell and/or subcarriers of center frequencies of other cells providing the same MBSFN service are included in the MBSFN frequency region, the UE processor may detect the MBSFN signal and the MBSFN RS by considering subcarrier(s) corresponding to center frequencies of the specific cell and/or other cells as not being included in the frequency region. For example, the UE processor may detect or decode the MBSFN RS in the MBSFN frequency region under the assumption that subcarrier indexes from '0' are sequentially newly assigned based on the MBSFN frequency region to subcarriers in the MBSFN frequency region of the specific cell. If the center frequency of the specific cell and/or the center frequencies of other cells are included in the MBSFN frequency region, the UE processor may detect or decode the MBSFN RS by regarding the subcarrier indexes as not being assigned to subcarriers corresponding to the center frequencies.

The above-described application examples of the present invention are applicable to both an LCT cell and an NCT cell except for the third application example. However, the application examples of the present invention may be limited only to the LCT cell. For example, in the LCT cell, the MBSFN subframe may be configured and the PMCH and the MBSFN RS are mapped as described in FIGS. 11 and 12 and, in the NCT cell, the MBSFN service may be configured according to the present invention as described above.

According to the present invention, the same MBSFN service can be provided even by cells having different BWs and/or different center frequencies. According to the present invention, the UE can seamlessly receive the MBSFN service even when the UE moves between difference cells and the different cells have different system BWs and different center frequencies.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving a broadcast/multicast service by a user equipment, the method comprising:
receiving, by the user equipment, frequency resource information of a serving cell; and
receiving, by the user equipment, the broadcast/multicast service using a frequency region based on the frequency resource information,
wherein the frequency resource information includes information indicating the frequency region to which the broadcast/multicast service is allocated within a system bandwidth of the serving cell,
wherein the frequency resource information further includes information on a center frequency of another cell that provides a service identical to the broadcast/multicast service, and
wherein a subcarrier corresponding to the center frequency of the another cell is not used for the reception of the broadcast/multicast service if the subcarrier corresponding to the center frequency of the another cell is within the frequency region to which the broadcast/multicast service is allocated within the system bandwidth of the serving cell.

2. The method according to claim 1, further comprising:
receiving, by the user equipment, a reference signal for the broadcast/multicast service within the frequency region.

3. The method according to claim 1,
wherein a subcarrier corresponding to a center frequency of the serving cell is not used for the reception of the broadcast/multicast service if the subcarrier corresponding to the center frequency of the serving cell is within the frequency region.

4. A user equipment for receiving a broadcast/multicast service, the user equipment comprising:
a radio frequency (RF) unit; and
a processor configured to:
control the RF unit to receive frequency resource information of a serving cell; and
control the RF unit to receive the broadcast/multicast service using a frequency region based on the frequency resource information,
wherein the frequency resource information includes information indicating the frequency region to which the broadcast/multicast service is allocated within a system bandwidth of the serving cell,
wherein the frequency resource information further includes information on a center frequency of another cell that provides a service identical to the broadcast/multicast service, and
wherein a subcarrier corresponding to the center frequency of the another cell is not used for the reception of the broadcast/multicast service if the subcarrier corresponding to the center frequency of the another cell is within the frequency region to which the broadcast/multicast service is allocated within the system bandwidth of the serving cell.

5. The user equipment according to claim 4,
wherein the processor is further configured to control the RF unit to receive a reference signal for the broadcast/multicast service within the frequency region.

6. The user equipment according to claim 4,
wherein a subcarrier corresponding to a center frequency of the serving cell is not used for the reception of the broadcast/multicast service if the subcarrier corresponding to the center frequency of the serving cell is within the frequency region.

7. A method for transmitting a broadcast/multicast service by a base station, the method comprising:
transmitting, by the base station, frequency resource information of a serving cell; and
transmitting, by the base station, the broadcast/multicast service using a frequency region based on the frequency resource information,
wherein the frequency resource information includes information indicating the frequency region to which the broadcast/multicast service is allocated within a system bandwidth of the serving cell,
wherein the frequency resource information further includes information on a center frequency of another cell that provides a service identical to the broadcast/multicast service, and
wherein a subcarrier corresponding to the center frequency of the another cell is not used for the reception of the broadcast/multicast service if the subcarrier corresponding to the center frequency of the another cell is within the frequency region to which the broadcast/multicast service is allocated within the system bandwidth of the serving cell.

8. The method according to claim 7, further comprising:
transmitting, by the base station, a reference signal for the broadcast/multicast service within the frequency region.

9. The method according to claim 7,
wherein a subcarrier corresponding to a center frequency of the serving cell is not used for the transmission of the broadcast/multicast service if the subcarrier corresponding to the center frequency of the serving cell is within the frequency region.

10. A base station for transmitting a broadcast/multicast service, the base station comprising:
a radio frequency (RF) unit; and
a processor configured to:
control the RF unit to transmit frequency resource information of a serving cell; and
control the RF unit to transmit the broadcast/multicast service using a frequency region based on the frequency resource information,
wherein the frequency resource information includes information indicating the frequency region to which the broadcast/multicast service is allocated within a system bandwidth of the serving cell,
wherein the frequency resource information further includes information on a center frequency of another cell that provides a service identical to the broadcast/multicast service, and
wherein a subcarrier corresponding to the center frequency of the another cell is not used for the transmission of the broadcast/multicast service if the subcarrier corresponding to the center frequency of the another cell is within the frequency region to which the broadcast/multicast service is allocated within the system bandwidth of the serving cell.

11. The base station according to claim 10,
wherein the processor is further configured to control the RF unit to transmit a reference signal for the broadcast/multicast service within the frequency region.

12. The base station according to claim 10,
wherein a subcarrier corresponding to a center frequency of the serving cell is not used for the transmission of the broadcast/multicast service if the subcarrier corresponding to the center frequency of the serving cell is within the frequency region.

* * * * *